(12) United States Patent
Kumagai et al.

(10) Patent No.: US 10,891,580 B2
(45) Date of Patent: Jan. 12, 2021

(54) SERVICE DESIGN ASSISTANCE SYSTEM AND SERVICE DESIGN ASSISTANCE METHOD

(71) Applicant: Hitachi, Ltd., Tokyo (JP)

(72) Inventors: Kiyoshi Kumagai, Tokyo (JP); Toshiyuki Ono, Tokyo (JP); Kenji Baba, Tokyo (JP); Masaaki Tanizaki, Tokyo (JP); Masataka Araki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 202 days.

(21) Appl. No.: 15/648,007

(22) Filed: Jul. 12, 2017

(65) Prior Publication Data
US 2017/0308838 A1    Oct. 26, 2017

Related U.S. Application Data

(63) Continuation of application No. PCT/JP2015/055406, filed on Feb. 25, 2015.

(51) Int. Cl.
    *G06Q 10/06*    (2012.01)
(52) U.S. Cl.
    CPC .  *G06Q 10/06393* (2013.01); *G06Q 10/06315* (2013.01); *G06Q 10/06375* (2013.01)
(58) Field of Classification Search
    None
    See application file for complete search history.

(56) References Cited

U.S. PATENT DOCUMENTS

| | | | | |
|---|---|---|---|---|
| 6,466,895 B1* | 10/2002 | Harvey | ............ | G05B 19/41875 |
| | | | | 702/181 |
| 8,165,907 B2* | 4/2012 | Pannatier | ........... | G06Q 10/0631 |
| | | | | 705/7.26 |
| 2008/0300888 A1* | 12/2008 | Dell'Anno | ............. | G06Q 30/02 |
| | | | | 705/1.1 |
| 2011/0067005 A1* | 3/2011 | Bassin | ................. | G06F 11/008 |
| | | | | 717/127 |

(Continued)

FOREIGN PATENT DOCUMENTS

| | | |
|---|---|---|
| JP | 11-85880 A | 3/1999 |
| JP | 2001-76045 A | 3/2001 |

(Continued)

OTHER PUBLICATIONS

Remarks by Director Iancu at the Artificial Intelligence Intellectual Property Considerations event Jan. 31, 2019 https://www.uspto.gov/about-us/news-updates/remarks-director-iancu-artificial-intelligence-intellectual-property (Year: 2019).*

(Continued)

*Primary Examiner* — Octavian Rotaru
(74) *Attorney, Agent, or Firm* — Crowell & Moring LLP

(57) ABSTRACT

A service design assistance apparatus includes an input apparatus, a storage, a display, and an arithmetic apparatus. The arithmetic apparatus, in response to a specific request received via an input apparatus, placing objects for a service of a new design target in corresponding areas on the design screen, the objects representing a relevant business, a problem with the business, a value to be obtained by solving the problem, a service to provide the value, and an apparatus or technology needed for the service.

1 Claim, 17 Drawing Sheets

(56) References Cited

U.S. PATENT DOCUMENTS

| | | | |
|---|---|---|---|
| 2011/0119088 A1* | 5/2011 | Gunn | G06F 19/00 705/3 |
| 2013/0191186 A1 | 7/2013 | Ludwig et al. | |
| 2013/0282336 A1* | 10/2013 | Maeda | G05B 23/02 702/184 |
| 2013/0318623 A1* | 11/2013 | Morinaga | G06Q 40/08 726/26 |
| 2015/0254597 A1* | 9/2015 | Jahagirdar | G06Q 10/06313 705/7.15 |

FOREIGN PATENT DOCUMENTS

| | | |
|---|---|---|
| JP | 2007-323575 A | 12/2007 |
| JP | 2011-221781 A | 11/2011 |
| WO | WO 2009/069474 A1 | 6/2009 |

OTHER PUBLICATIONS

International Search Report (PCT/ISA/210) issued in PCT Application No. PCT/JP2015/055406 dated Apr. 7, 2015 with English-language translation (two (2) pages).

Japanese-language Written Opinion (PCT/ISA/237) issued in PCT Application No. PCT/JP2015/055406 dated Apr. 7, 2015 (three (3) pages).

* cited by examiner

CLIENT BUSINESS INFORMATION TABLE 225

| BUSINESS ID | BUSINESS NAME | PROPERTY INFORMATION ||||||
|---|---|---|---|---|---|---|---|
| | | BUSINESS CLASSIFICATION | TYPE OF INDUSTRY | BUSINESS CHARACTERISTICS |||| |
| | | | | RELIABILITY | SAFETY | FACILITY COST | FAILURE RISK | ... |
| 001-B001 | CONSTRUCTION EXECUTION | EXECUTION | CONSTRUCTION | MIDDLE | HIGH | HIGH | HIGH | ... |
| 001-B002 | CONSTRUCTION INSPECTION | INSPECTION | CONSTRUCTION | MIDDLE | HIGH | HIGH | HIGH | ... |
| ... | ... | ... | ... | ... | ... | ... | ... | ... |
| 101-B001 | POWER GENERATION OPERATION | OPERATION | POWER GENERATION | HIGH | HIGH | HIGH | HIGH | ... |

FIG. 5

CLIENT PROBLEM INFORMATION TABLE 226

| PROBLEM ID | PROBLEM NAME | PROPERTY INFORMATION | | RELATED LINK INFORMATION |
| --- | --- | --- | --- | --- |
| | | PROBLEM CLASSIFICATION | TYPE OF INDUSTRY | BUSINESS ID |
| 001-I001 | FAILURE REDUCTION | FAILURE | CONSTRUCTION | 001-B001 |
| 001-I002 | THEFT PREVENTION | THEFT | CONSTRUCTION | 001-B002 |
| ... | ... | ... | ... | ... |
| 101-I001 | FAILURE PREVENTION | FAILURE | POWER GENERATION | 101-B001 |

FIG. 6

CLIENT VALUE INFORMATION TABLE 227

| VALUE ID | VALUE NAME | PROPERTY INFORMATION VALUE CLASSIFICATION | RELATED LINK INFORMATION PROBLEM ID |
|---|---|---|---|
| 001-V001 | FAILURE RISK REDUCTION | RISK REDUCTION | 001-I001 |
| 001-V002 | INCREASE IN PROFIT FROM EXECUTION | PROFIT INCREASE | 001-I002 |
| 001-V003 | FUEL COST REDUCTION | COST REDUCTION | 001-I003 |
| ... | ... | ... | ... |
| 101-V001 | FAILURE RISK REDUCTION | RISK REDUCTION | 101-I001 |

FIG. 7

PRODUCT/TECHNOLOGY INFORMATION TABLE 228

| PRODUCT/TECHNOLOGY ID | PRODUCT/TECHNOLOGY NAME | PROPERTY INFORMATION | | RELATED LINK INFORMATION | |
|---|---|---|---|---|---|
| | | PRODUCT/TECHNOLOGY CLASSIFICATION | TYPE OF INDUSTRY | SERVICE ID | BUSINESS ID |
| 001-PT001 | GPS MONIOR | MONITORING TECHNOLOGY | COMMUNICATIONS | 001-S001 | — |
| 001-PT002 | HYDRAULIC EXCAVATOR | CONSTRUCTION MACHINE | CONSTRUCTION | 001-S002 | — |
| ... | ... | ... | ... | ... | ... |
| 101-PT001 | PHOTOVOLTAIC POWER GENERATION SYSTEM | POWER GENERATION SYSTEM | POWER GENERATION | 101-S001 | — |

FIG. 8

PRODUCT-RELATED TASK INFORMATION TABLE 229

| PRODUCT-RELATED TASK ID | PROPERTY INFORMATION | | | RELATED LINK INFORMATION |
|---|---|---|---|---|
| | PRODUCT-RELATED TASK NAME | PRODUCT-RELATED TASK CLASSIFICATION | TYPE OF INDUSTRY | PRODUCT/TECHNOLOGY ID |
| 001-PB001 | MACHINE INTRODUCTION | INTRODUCTION | CONSTRUCTION | 001-PT001 |
| 001-PB002 | MACHINE MAINTENANCE | MAINTENANCE | CONSTRUCTION | 001-PT001 |
| 001-PB003 | MACHINE DISPOSAL | DISPOSAL | CONSTRUCTION | 001-PT001 |
| ... | ... | ... | ... | ... |
| 101-PB001 | SYSTEM INSTALLATION | INTRODUCTION | POWER GENERATION | 101-PT001 |

FIG. 9

SERVICE INFORMATION TABLE 230

| SERVICE ID | SERVICE NAME | PROPERTY INFORMATION | | SIMILAR SERVICE ID | RELATED LINK INFORMATION | |
|---|---|---|---|---|---|---|
| | | SERVICE CLASSIFICATION | TYPE OF INDUSTRY | | BUSINESS ID | PRODUCT/TECHNOLOGY ID |
| 001-S001 | CONSTRUCTION MACHINE UTILIZATION RATE GUARANTEE SERVICE | GUARANTEE | CONSTRUCTION | 011-S001 | 001-B001 | 001-PT001 |
| 001-S002 | CONSTRUCTION MACHINE FAILURE PREDICTION SERVICE | PREDICTION | CONSTRUCTION | — | 001-B002 | 001-PT002 |
| 001-S003 | CONSTRUCTION MACHINE MAINTENANCE SERVICE BY AGENT | SERVICE BY AGENT | CONSTRUCTION | — | 001-B003 | 001-PT003 |
| ... | ... | ... | ... | ... | ... | ... |
| 011-S001 | MEDICAL EQUIPMENT UTILIZATION RATE GUARANTEE SERVICE | GUARANTEE | MEDICAL CARE | — | 011-B011 | 011-PT011 |
| 011-S002 | MEDICAL EQUIPMENT FAILURE PREDICTION SERVICE | PREDICTION | MEDICAL CARE | — | 011-B011 | 011-PT012 |
| ... | ... | ... | ... | ... | ... | ... |
| 101-S001 | POWER GENERATION SYSTEM UTILIZATION RATE GUARANTEE SERVICE | GUARANTEE | POWER GENERATION | 001-S001 | 101-B101 | 101-PT101 |

FIG. 10

SERVICE DESIGN ASSISTANCE SYSTEM AND SERVICE DESIGN ASSISTANCE METHOD

The embodiments of the present invention relate to a service design assistance apparatus, system, and method.

BACKGROUND

For companies' various activities such as designing and developing services and products, a knowledge management technique has been proposed in which information having been accumulated by a company through its past activities is shared and effectively used as the knowledge by the entire company. The following techniques have been proposed in relation to the knowledge management technique.

One of the proposed techniques is a service description technique in which, for the purpose of creating a service value map for describing relationships between services and client values, components of the service are described hierarchically, and their dependence relationships are also described (see PTL 1).

Furthermore, for the purpose of finding a similar service which has a similarity relationship with a service of a comparison subject, a similar service retrieval system has been proposed which includes: a service component similarity calculation unit for referring to a service storage unit which stores multiple services each including one or more service components to calculate a service component similarity between a service component composing a service of a comparison subject and a service component composing a service to be compared; and a service similarity calculation unit for calculating a service similarity between the service of the comparison subject and the service to be compared based on the calculated service component similarity (see PTL 2).

CITATION LIST

Patent Literature

[PTL 1] US2013/0191186
[PTL 2] WO2009/069474

SUMMARY

Meanwhile, product businesses have been rapidly commoditized in the global market surrounding each company. A business focus has started to shift from the product businesses to service businesses for maximizing product values. Particularly for large companies having competitive products and technologies in multiple business fields, service design through client/service provider collaboration has become increasingly important in which a service for solving a business problem of a client is created in corporation with the client by utilizing the products and technologies.

Such a service design through client/service provider collaboration requires assistance for their collaborative activities in order for a service providing company and a client company to understand and share an image of a service to be created. For example, the business of the client company and a problem with the business need to be described to clarify values which the client company seeks. In addition, products and technologies expected to solve the problem needs to be well organized and utilized to design a new service in corporation with the client company. In this respect, the issues are to appropriately describe the structure of the service to be created through client/service provider collaboration, and to efficiently create a service idea as a core of the new service by employing past service examples.

Meanwhile, the proposed conventional techniques include a technique of describing relationships between services and client values using objects and the like depending on the necessity, as well as a technique of retrieving similar services by defining and calculating inter-service similarities. However, there has still been no technique to address the needs of appropriately selecting a suitable service, as well as products and technologies needed for the service from a wide range of knowledge fully covering a type of industry to which the client company belongs and the client company itself with the client problem with a service of a design target taken into consideration, and to use them for the new service design.

In view of the above, an object of the embodiments of the present invention is to provide a technique of enabling efficient and appropriate assistance in service design by presenting, in a multifaceted and easy-to-understand way, a service effective in solving a business problem, and products and technologies for constituting the service.

A service design assistance apparatus and system according to an embodiment of the invention for the purpose of solving the foregoing problems is characterized in that the service design assistance system includes a storage apparatus configured to store objects for defining a service to provide a value toward solving a business problem, and data on a design screen on which to place the objects, and an arithmetic apparatus configured to perform a process of: in response to a specific request received via an input apparatus, placing objects for a service of a new design target in corresponding areas on the design screen, the objects representing a relevant business, a problem with the business, a value to be obtained by solving the problem, a service to provide the value, and an apparatus or technology needed for the service; via the input apparatus, receiving names and attributes of the objects, and an instruction to place link objects depending on relationships between the objects, and on an output apparatus, displaying the objects placed in the corresponding areas, and linked one to another with the link objects; and into the storage apparatus, storing information on the names and the attributes of the objects, and the relationships between the objects.

Furthermore, a service design assistance method is characterized in that the service design assistance method causes a computer, including a storage apparatus configured to store objects for defining a service to provide a value toward solving a business problem, and data on a design screen on which to place the objects, to perform a process including: in response to a specific request received via an input apparatus, placing objects for a service of a new design target in corresponding areas on the design screen, the objects representing a relevant business, a problem with the business, a value to be obtained by solving the problem, a service to provide the value, and an apparatus or technology needed for the service; via the input apparatus, receiving names and attributes of the objects, and an instruction to place link objects depending on relationships between the objects, and on an output apparatus, displaying the objects placed in the corresponding areas, and linked one to another with the link objects; and into the storage apparatus, storing information on the names and the attributes of the objects, and the relationships between the objects.

ADVANTAGEOUS EFFECTS OF INVENTION

The inventive service design assistance apparatus, system, and method make it possible to effectively and appropriately assist in service design by, in a multifaceted and easy-to-understand way, presenting: a service effective in solving a business problem; and products and technologies needed for the service.

BRIEF DESCRIPTION OF DRAWINGS

FIG. 5 is a diagram illustrating an example of a client business information table.

FIG. 6 is a diagram illustrating an example of a client problem information table.

FIG. 7 is a diagram illustrating an example of a client value information table.

FIG. 8 is a diagram illustrating an example of a product/technology information table.

FIG. 9 is a diagram illustrating an example of a product-related task information table.

FIG. 10 is a diagram illustrating an example of a service information table.

DETAILED DESCRIPTION OF EMBODIMENTS

Figure 1:
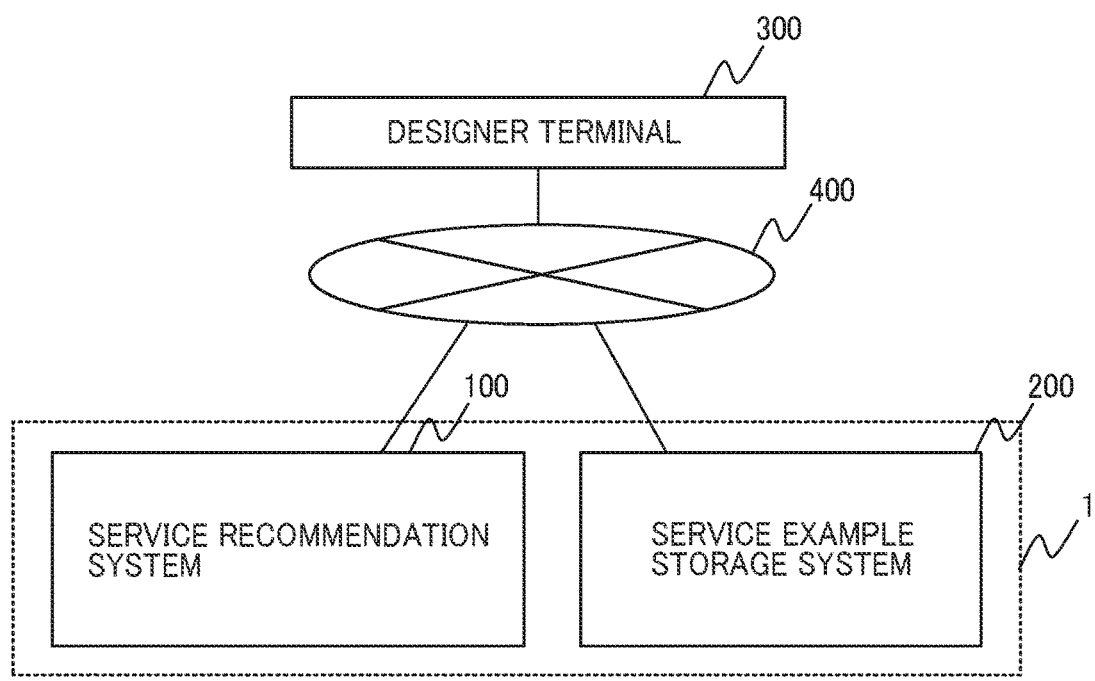
FIG. 1 is a configuration diagram illustrating a network including a service design assistance system.

Detailed descriptions will be hereinbelow provided for an embodiment of the present invention using the drawings. FIG. 1 is a diagram illustrating a configuration example of a network including a service design assistance system 1 in an embodiment. A service design assistance system 1 illustrated in FIG. 1 is a computer system configured to be capable of effectively and appropriately assisting in service design by, in a multifaceted and easy-to-understand way, presenting: a service effective in solving a business problem; and products and technologies needed for the service.

In the embodiment, as the minimum configuration, the service design assistance system 1 includes a service recommendation system 100 and a service example storage system 200. It is a matter of course that in a case where data are stored in the service recommendation system 100 instead of in the service example storage system 200, the service design assistance system 1 may be made up from the service recommendation system 100 alone.

The service recommendation system 100 and the service example storage system 200 included in the service design assistance system 1 are coupled to a network 400, and are capable of communicating data with each other through the network 400. In addition, the service recommendation system 100 is configured to be capable of, through the network 400, sending and receiving data to and from a designer terminal 300 which a person in charge of the service design (hereinafter referred to as a "designer") manipulates. Incidentally, multiple designer terminals 300 and multiple service example storage systems 200 may be coupled to the network 400. Furthermore, the network 400 may be a LAN, the Internet, or an arbitrary wired or wireless network.

It should be noted that the embodiment is aimed particularly at assisting a designer in a company in designing a service for helping a client company to solve a business problem by the designer's use of (knowledge about) products and technologies already possessed by the company with which the designer works, its affiliated companies and the like, such that the service design assistance system 1 provides the designer with: past cases involving similar services which solved similar business problems; and past cases involving related services which increased the profitability and effectiveness of the similar services when provided in conjunction with the similar services.

(Hardware Configuration)

Figure 2:
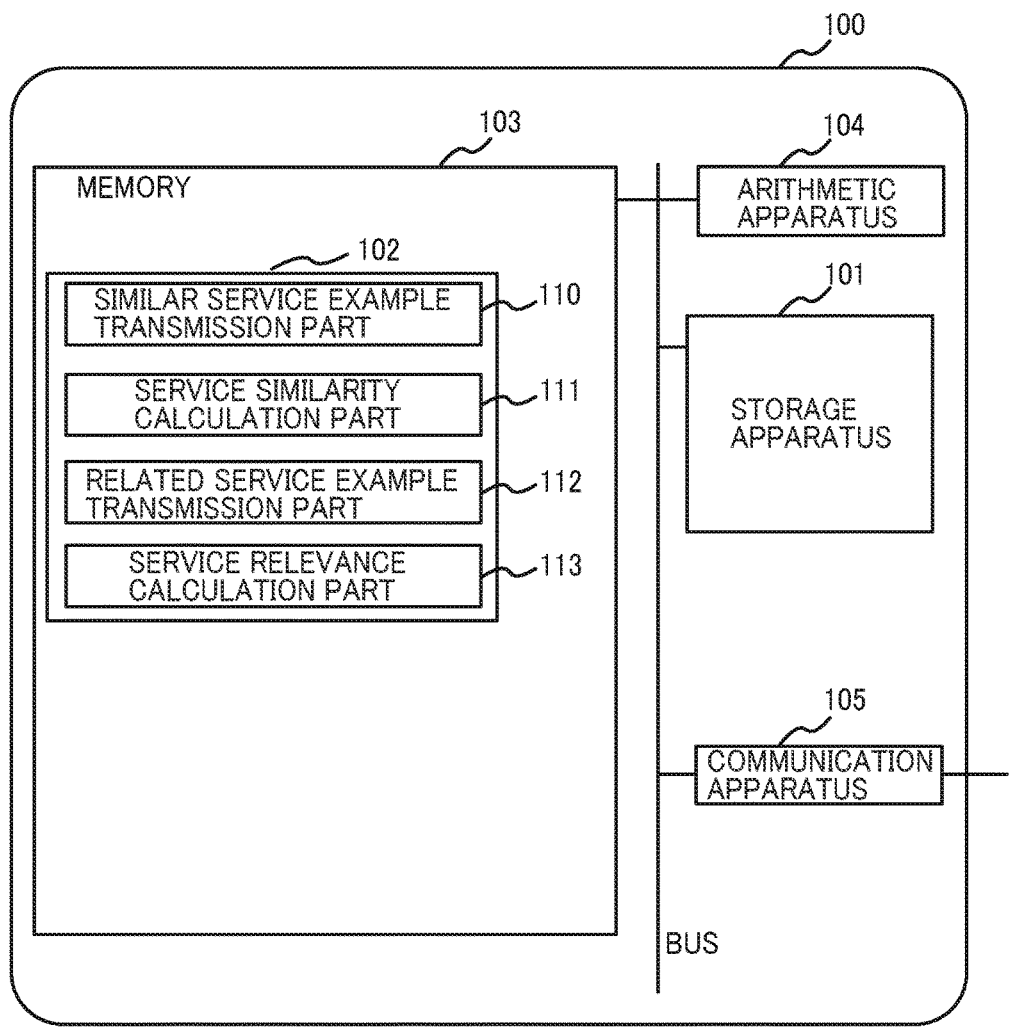
FIG. 2 is a diagram illustrating an example of a hardware configuration of a service recommendation system.

Next, descriptions will be provided for a hardware configuration of each system included in the service design assistance system 1 in the embodiment. FIG. 2 is a diagram illustrating an example of a hardware configuration of the service recommendation system 100 in the embodiment. The service recommendation system 100, an example of which is illustrated herein, includes: a storage apparatus 101 made from an appropriate non-volatile storage device, such as a hard disk drive; a memory 103 made from a volatile storage device, such as a RAM; an arithmetic apparatus 104 configured to perform overall control on the system by loading a program 102 onto the memory 103 to execute the program 102, and to perform various determination, arithmetic and control processes; and a communication apparatus 105 coupled to the network 400, and configured to process communications with the other system.

As discussed above, by executing the program 102, the service recommendation system 100 implements a similar service example transmission part 110, a service similarity calculation part 111, a related service example transmission part 112 and a service relevance calculation part 113, as the essential functions. Similarly, the other system is configured to implement its functions by executing the program.

It should be noted that in addition to the foregoing configuration, the service recommendation system 100 of the embodiment may include: a recording medium reader apparatus configured to read the program 102 from a recording medium, such as a flexible disk, a semiconductor memory or a magnetic tape, which stores the program 102, and to store the program 102 into the memory 103; an input apparatus, such as a keyboard and/or a mouse, which receives the designer's input manipulations; and an output apparatus, such as a display and/or a speaker, which outputs process results.

Figure 3:
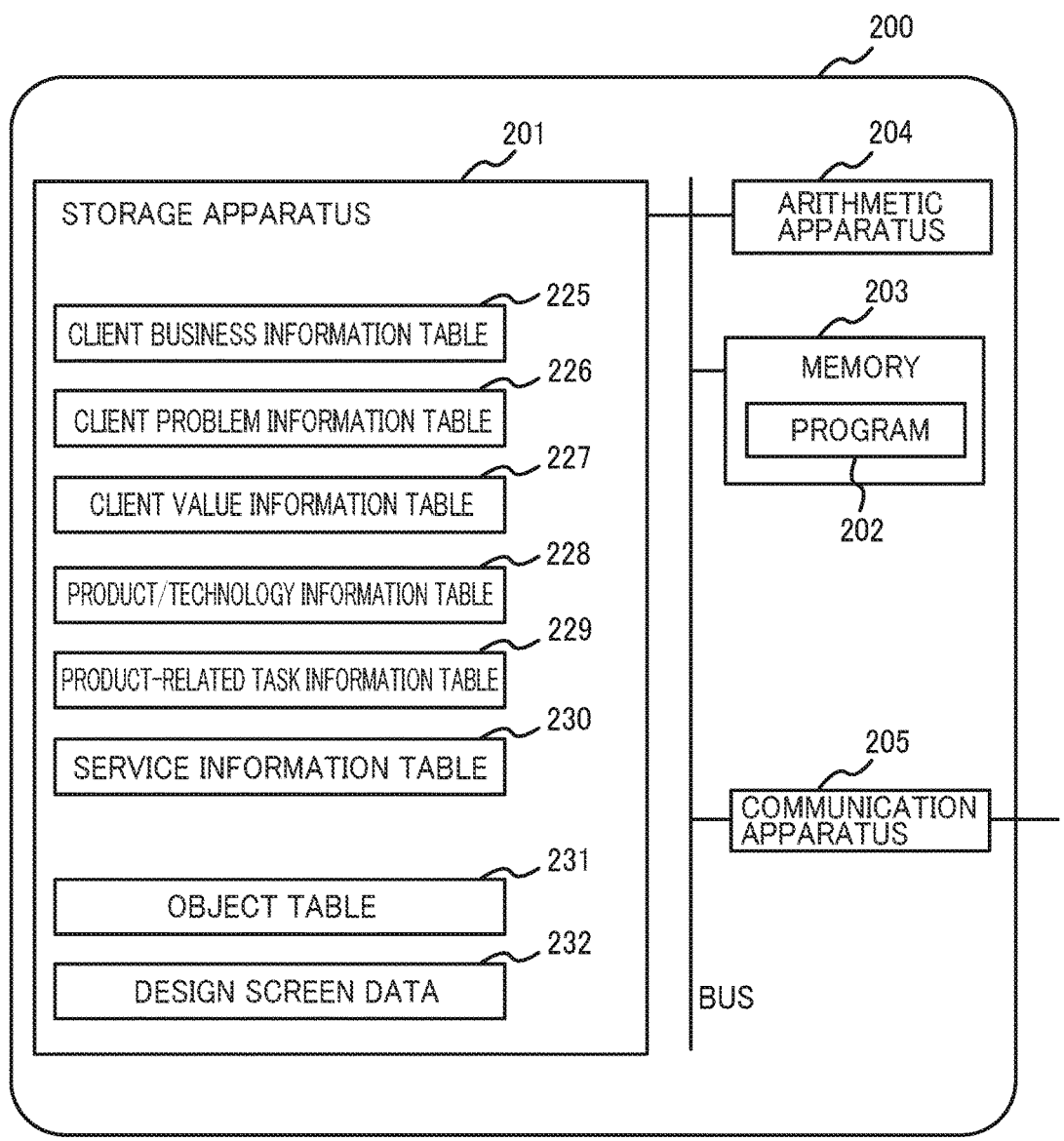
FIG. 3 is a diagram illustrating an example of a hardware configuration of a service example storage system.

Next, descriptions will be provided for an example of a hardware configuration of the service example storage system 200 in the embodiment. FIG. 3 is a diagram illustrating an example of the hardware configuration of the service example storage systems 200 in the embodiment. The service example storage systems 200 is a server apparatus configured: to store and accumulate various types of data on the service design which, as discussed above, is sent from the designer terminal 300; and to, depending on a request from the service recommendation system 100, provide relevant information as appropriate. In other words, the service example storage systems 200 serves as the DB server for the service design assistance system 1.

Like the service recommendation system 100, the service example storage system 200 includes: a storage apparatus 201 made from an appropriate non-volatile storage device such as a hard disk drive, and at least configured to hold various tables 225 to 232; a memory 203 made from a volatile storage device such as a RAM; an arithmetic apparatus 204 configured to perform overall control on the system by loading a program 202 onto the memory 203 to execute the program 202, and to perform various determination, arithmetic and control processes; and a communication apparatus 205 coupled to the network 400, and configured to process communications with the other system.

Detailed descriptions will be provided for the various tables 225 to 232 to be held in the storage apparatus 201.

Figure 4:
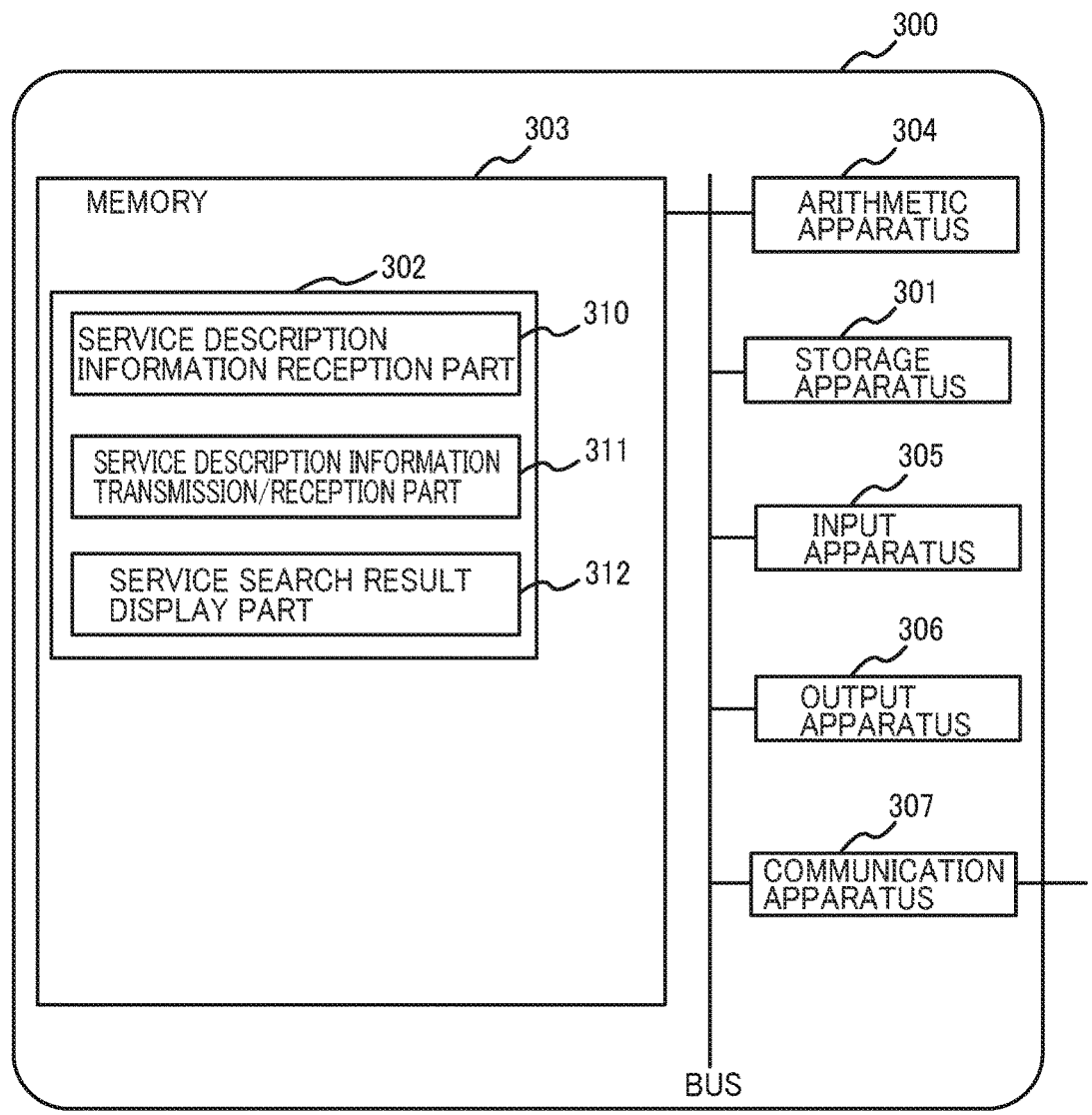
FIG. 4 is a diagram illustrating an example of a hardware configuration of a designer terminal.

Next, descriptions will be provided for an example of a hardware configuration of the designer terminal 300 in the embodiment. FIG. 4 is a diagram illustrating an example of the hardware configuration of the designer terminal 300 in the embodiment. The designer terminal 300 is a generally-used computer terminal. The designer terminal 300 includes: a storage apparatus 301 made from an appropriate non-volatile storage device such as a hard disk drive; a memory 303 made from a volatile storage device such as a RAM; an arithmetic apparatus 304 configured to perform overall control on the terminal by loading a program 302 onto the memory 303 to execute the program 302, and to perform various determination, arithmetic and control processes; an input apparatus 305, such as a keyboard and/or a mouse, which receives the designer's input manipulations; an output apparatus 306, such as a display and/or a speaker, which outputs a process result; and a communication apparatus 307 coupled to the network 400, and configured to process communications with the service recommendation system 100.

By executing the program 302, the designer terminal 300 implements a service description information reception part 310, a service description information transmission part 311, and a service search result display part 312, as the essential functions.

(Examples of Functions)

Next, descriptions will be provided for the functions possessed by the service recommendation system 100 and the service example storage system 200. Incidentally, depending on the necessity, descriptions will be provided for the functions of the designer terminal 300 which sends and receives data to and from the service recommendation system 100 and the service example storage system 200.

In response to a specific request received from the designer terminal 300, the service example storage system 200 in the embodiment performs a function of: with relevance to a service of a new design target, from an object table 231, reading objects respectively representing a relevant business, a problem with the business, a value expected to be obtained when the problem is solved, a service expected to provide the value, and an apparatus or a technology needed for the service; placing the objects into their respective corresponding areas on a design screen data 232; sending data on the design screen to the designer terminal 300, and causing the designer terminal 300 to display the design screen; from the designer terminal 300, receiving the name and attribute of each of the objects currently on display on the design screen, as well as an instruction to place link objects depending on relationships between the objects; sending the designer terminal 300 data on a screen on which the objects placed in their respective corresponding areas are linked one to another with the link objects, and causing the designer terminal 300 to display the screen; and storing into the storage apparatus 301 information on the name of each relevant object, information on the attributes of each relevant objects, and information on the relationships between the objects.

Meanwhile, the service recommendation system 100 performs a function: based on an attribute of the problem object placed on the design screen, identifying a past problem sharing the certain common attribute with the problem, from a client problem information table 226 held in the service example storage system 200; from a client business information table 225, extracting characteristic information on a past business which is related to the identified problem; with regard to determining the degree of similarity of the extracted characteristic information with characteristic information which is represented by the attribute of the relevant problem of the current design target; identifying, as a similar service, a past service provided for the past business having the degree of its similarity equal to or greater than a predetermined reference value, from the service information table 230 in the service example storage system 200; placing an object representing information on the similar service into a corresponding area on the design screen in a manner selectable as an object of the relevant service of the current design target; sending data on the screen to the designer terminal 300; and causing the designer terminal 300 to display the screen.

Furthermore, upon receipt from the designer terminal 300 of an instruction to placing an object of the similar service placed on the design screen, into an object display area for the relevant service of the current design target, the service example storage system 200 performs a function of: placing the object of the similar service into the display area on the design screen by moving the object to the display area; sending data on the screen to the designer terminal 300, and causing the designer terminal 300 to display the screen; from the designer terminal 300, receiving the names and attributes of the relevant objects, as well as an instruction to place link objects depending on relationships between the objects and other objects; causing the designer terminal 300 to display the relevant objects linked one to another with the link objects; and storing into the storage apparatus 301 information on the name of each object, information on the attributes of each object, and information on the relationships between the objects.

The service example storage system 200 further performs a function of, in addition to the names and attributes of the respective objects, as well as the relationships between the objects, storing information on a similarity relationship between the foregoing similar service and the relevant service of the current design target into the storage apparatus 301. In this case, the service recommendation system 100 performs a function of: from the service information table 230 in the service example storage system 200, identifying services having a series of similarity relationships with the similar service whose object is requested to be placed into the display area, as well as related services provided in conjunction with such services; identifying related services with co-occurrence equal to or greater than a predetermined reference level among the identified services; placing an object representing information on each of the thus-identified related services into a corresponding area on the design screen in a manner selectable as an object of the relevant service of the current design target; sending data on the screen to the designer terminal 300; and causing the designer terminal 300 to display the screen.

Moreover, upon receipt from the designer terminal 300 of an instruction to place an object of the related service into the object display area for the relevant service of the current design target, the service example storage system 200 performs a function of: placing the object of the relevant related service into the object display area on the display screen; sending data on the screen to the designer terminal 300, and causing the designer terminal 300 to display the screen; from the designer terminal 300, receiving the names and attributes of the relevant objects, as well as an instruction to place link objects depending on relationships between the objects and other objects; sending the designer terminal 300 data on a screen on which the relevant objects are linked one to another with the link objects, and causing the designer terminal 300 to display the screen; and storing into the storage apparatus 301 information on the name of each object, information on the attribute of each object, and information on the relationships between the objects.

It should be noted that out of the foregoing functions, the function of, in response to the predetermined input from the designer terminal 300, identifying the degree of service similarity based on the client business information table 225, the client problem information table 226, the service information table 230 and the like in the service example storage system 200 is a function to be performed by the service similarity calculation part 111 in the service recommendation system 100. In addition, the series function of identifying the similar service based on the similarity degree identified by the service similarity calculation part 111, as well as correspondingly displaying the objects, and obtaining and storing the various sets of information is a function to be performed by the similar service example transmission part 110 in the service recommendation system 100.

Furthermore, the function of identifying the co-occurrence between the services based on the service information table 230 in the service example storage system 200 is a function to be performed by the service relevance calculation part 113 in the service recommendation system 100. Moreover, the series function of identifying the related services with co-occurrence equal to or greater than the predetermined reference level, placing the object representing the information of the related service into the corresponding area on the design screen in a manner selectable as the object of the relevant service of the current design target, and sending the data on the screen to the designer terminal 30 is a function to be performed by the related service example transmission part 112.

Meanwhile, the designer terminal 300 possesses the functions to be performed respectively by the service description information reception part 310, the service description information transmission part 311, and the service search result display part 312. Out of these parts, the service description information reception part 310 performs a function of, with regard to the current design target service, from the designer through the input apparatus 305, receiving the input of information on descriptions about the objects of the relevant client business, problem, value, product/technology, product-related task and service of the current service design target, that is to say, service description.

Furthermore, the service description information transmission part 311 performs a function of: sending the service description information, which is received through the input apparatus 305, to the service recommendation system 100 and the service example storage system 200; and from the service recommendation system 100, receiving a result of searching for examples of the similar and related services. Moreover, the service search result display part 312 performs a function of causing the output apparatus 306 to display the result of searching for the examples of the similar and related services which is received from the service recommendation system 100.

(Examples of Data Configurations)

Next, descriptions will be provided for what data are held in the service example storage system 200 in the service design assistance system 1 in the embodiment. FIG. 5 is a diagram illustrating an example of the client business information table 225 in the embodiment. The client business information table 225 is a table held by the service example storage system 200. The client business information table 225 illustrated in FIG. 5 is a set of records each storing: as a key, a business ID used to uniquely identify a business in which a client was engaged in the past; and values respectively representing the name of the business, the classification of the business, the type of industry to which the business belongs, and characteristics of the business. The embodiment illustrates an example in which: the business characteristics are attributes such as the reliability, safety, facility cost and failure risk involved in the relevant business, and are given their respective values.

FIG. 6 is a diagram illustrating an example of the client problem information table 226 in the embodiment. The client problem information table 226 is a table held by the service example storage system 200. The client problem information table 226 illustrated in FIG. 6 is a set of records each storing: as a key, a problem ID used to uniquely identify a problem which a client recognized in a past business; and values respectively representing the name of the problem, property information (the classification of the problem, and the type of industry in which the client recognized the problem), and related link information. Out of the elements stored in each record, the related link information is a common ID shared by a business ID in the client business information table 225 illustrated in FIG. 5, and serves as a value for associating a problem with a business in which the problem was recognized (the problem took place).

FIG. 7 is a diagram illustrating an example of the client value information table 227 in the embodiment. The client value information table 227 is a table held by the service example storage system 200. The client value information table 227 illustrated in FIG. 7 is a set of records each storing: as a key, a value ID used to uniquely identify a value expected to be obtained when a problem recognized by a client in a past business is solved; and values respectively representing the name of the value, property information (the classification of the value), and related link information. Out of the elements stored in each record, the related link information is a common ID shared by a problem ID in the client problem information table 226 illustrated in FIG. 6, and serves as a value for associating the relevant value with the corresponding problem.

FIG. 8 is a diagram illustrating an example of a product/technology information table 228 in the embodiment. The product/technology information table 228 is a table held by the service example storage system 200. The product/technology information table 228 illustrated in FIG. 8 is a set of records each storing: as a key, a product/technology ID used to uniquely identify a product/technology which was employed for a service designed in the past; and values respectively representing the name of the product/technology, property information (the classification of the product/technology, and the type of industry in which the product/technology was employed), and related link information (a service ID and a business ID). Out of the elements stored in each record, the business ID in the related link information is a common ID shared by a business ID in the tables 225, 226 illustrated in FIGS. 5 and 7, and the service ID in the related link information is a common ID shared by a service ID in the service information table 230, which will be discussed in detail later. The service ID in the related link information serves as a value for associating the product/technology with a service for which the product/technology was employed, and the business ID in the related link information serves as a value for associating the service with a problem which the service was employed to solve.

FIG. 9 is a diagram illustrating an example of a product-related task information table 229 in the embodiment. The product-related task information table 229 is a table held by the service example storage system 200. The product-related task information table 229 illustrated in FIG. 9 is a set of records each storing: as a key, a product-related task ID used to uniquely identify a task related to a product or a technology; and values respectively representing the name of the product-related task, property information (the classification of the product-related task, and the type of industry in which the product-related task was performed); and related link information. Out of the elements stored in each record, a product/technology ID in the related link information is a common ID shared by a product/technology ID in the product/technology information table 228 illustrated in FIG. 8, and serves as a value for associating the product-related task with the accompanying product/technology.

FIG. 10 is a diagram illustrating an example of the service information table 230 in the embodiment. The service information table 230 is a table held by the service example storage system 200. The service information table 230 illustrated in FIG. 10 is a set of records each storing: as a key, a service ID used to uniquely identify a service which was designed in the past; and values respectively representing the name of the service, property information (the classification of the service, and the type of industry for which the service was designed), similar service ID, and related link information (the business ID and the product/technology ID). Out of the elements stored in each record, the similar service ID is an ID for identifying a similar service which provides a foundation for the relevant service indicated by the service ID. A service design assistance technique in the embodiment employs a process of, before starting to design a service, informing the designer of a similar service (a service among past examples) which is expected to convert into the service of the current design target. Thus, if the designer decides to use the similar service for the service of the current design target, a record including a new service ID is added to the service information table 230, and the ID of the similar service of the source of the diversion is set into the "Similar Service ID" column (this process will be discussed later). Furthermore, the business ID in the related link information is a value representing the design target service of the relevant service, and the product/technology ID in the related link information is a value representing the product/technology employed for the relevant service.

Figure 11:
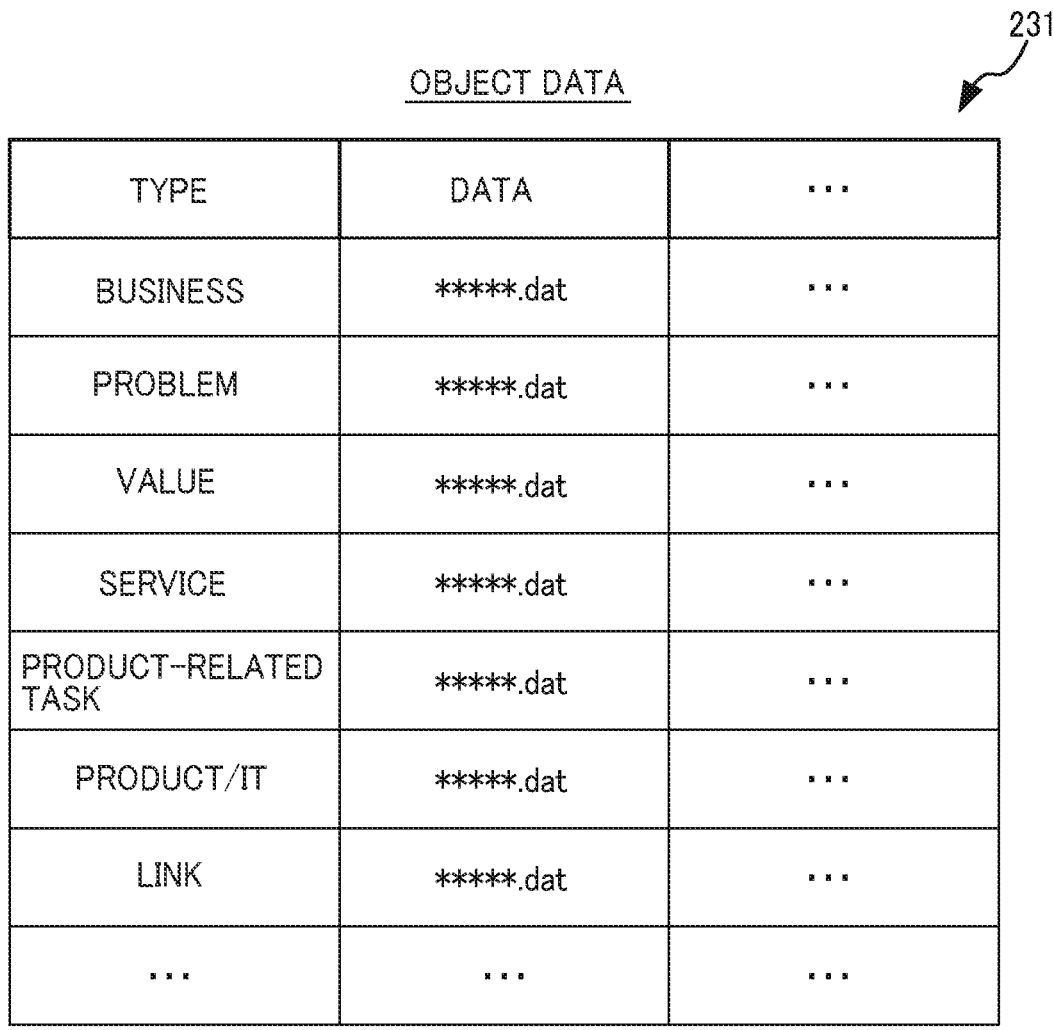
FIG. 11 is a diagram illustrating an example of an object table.

FIG. 11 illustrates an example of the object table 231 in the embodiment. The object table 231 is a table storing data on the various objects which are provided by the service example storage system 200 to the designer terminal 300 and are displayed on the design screen. A data structure of the object table 231 is a set of records which respectively store: objects such as the business, problem, value, service, product-related task, product/technology and link; and drawing datasets associated with them.

Figure 15:
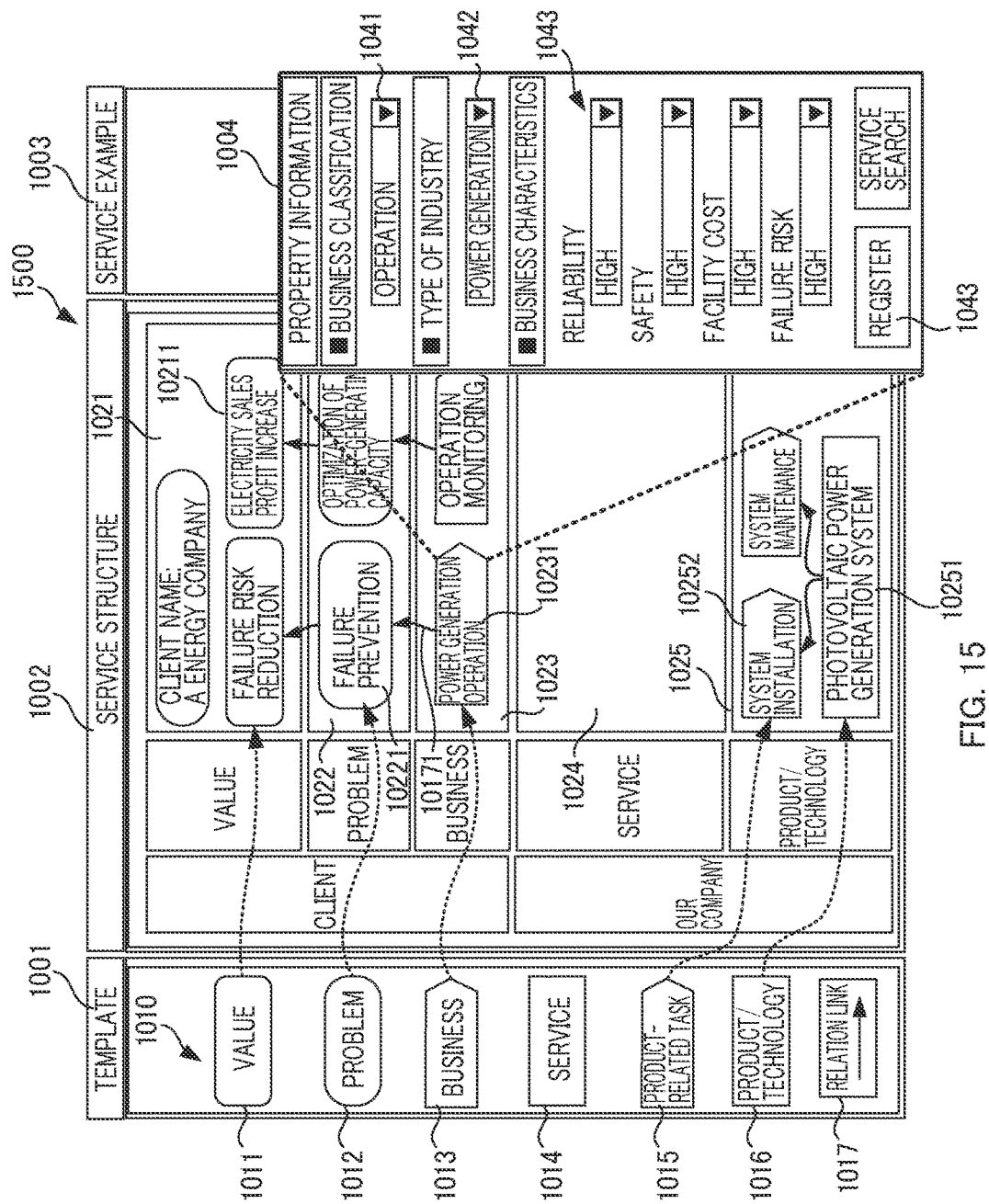
FIG. 15 is a diagram illustrating Screen example 1.
Figure 16:
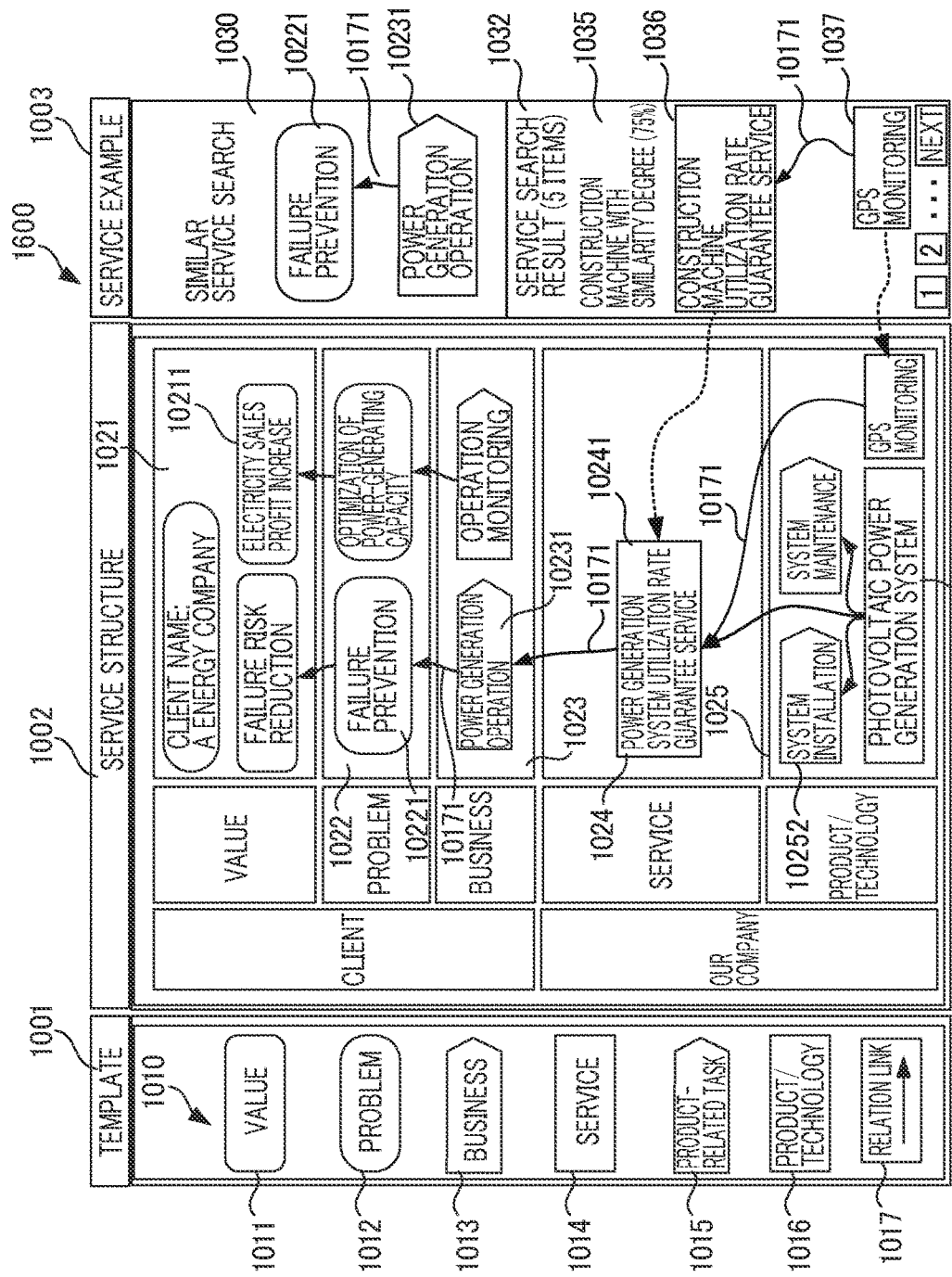
FIG. 16 is a diagram illustrating Screen example 2
Figure 17:
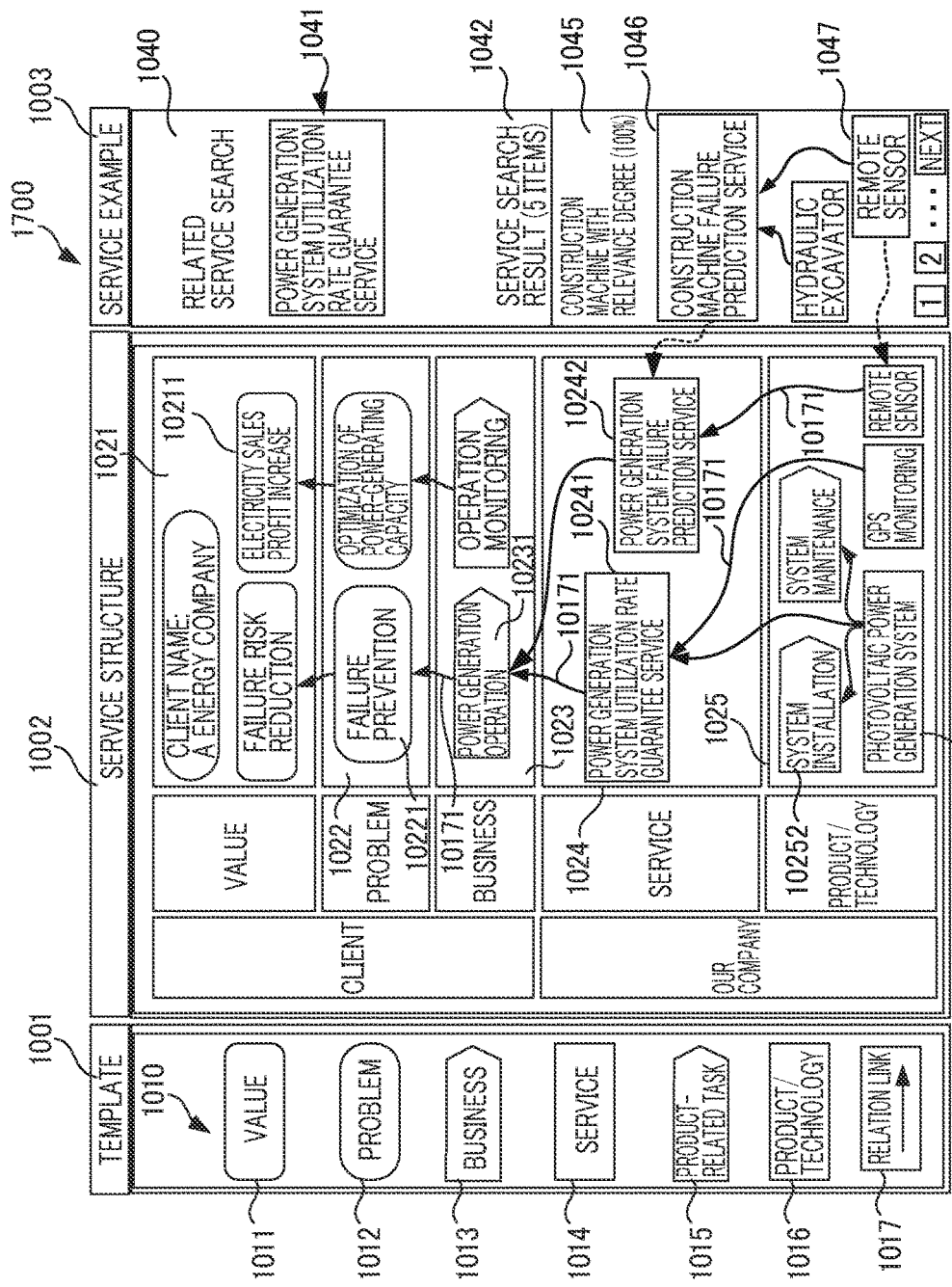
FIG. 17 is a diagram illustrating Screen example 3.

It should be noted that, albeit not illustrated, the design screen data 232 held in the storage apparatus 201 by the service example storage system 200 may be screen data corresponding to a frame configuration, as illustrated in screen examples in FIGS. 15 to 17, which includes: a template frame 1001 where objects 1011 to 1017 associated respectively with the object datasets in the object table 231 are displayed as a template group 1010; a service structure frame 1002 serving as a display area into which the designer places a desired object by dragging the desired object from the template group 1010; and a service example frame 1003 serving a display area where information on a similar service, information on a related service, and objects are displayed.

(Examples of Process Flow)

Figure 12:
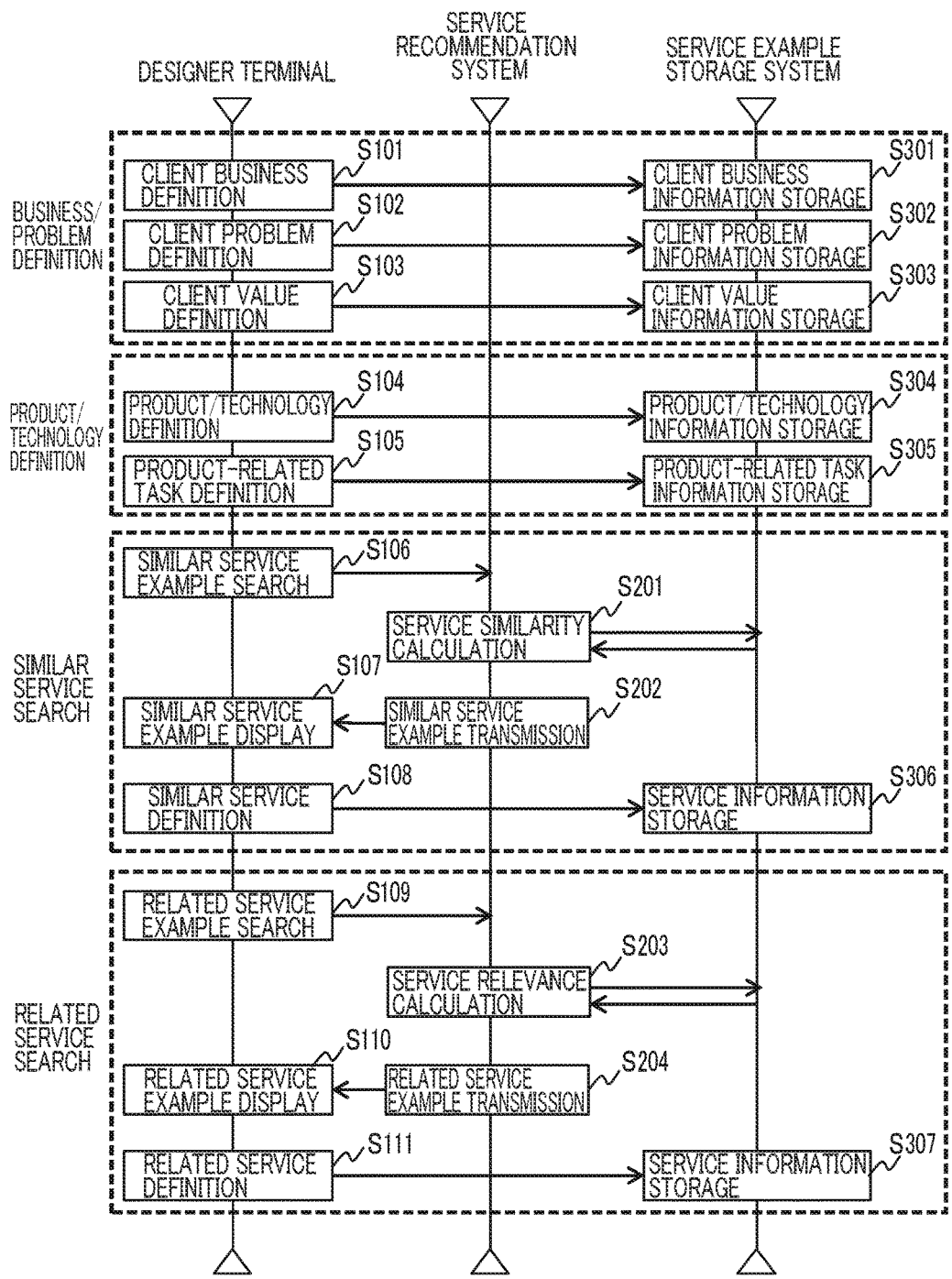
FIG. 12 is a flowchart illustrating Procedure example 1 of a service design assistance method.

Next, based on the drawings, descriptions will be provided for an actual procedure for a service design assistance method in the embodiment. FIG. 12 is a flowchart illustrating Process procedure example 1 of the service design assistance method in the embodiment. To put it specifically, FIG. 12 illustrates a process flow which sequentially includes: from the designer terminal 300, receiving descriptive information on a client's business, problem and value, product/technology, product-related task and service to be taken into consideration for a service design target; searching for an example of a similar service which solved a similar business problem; searching for an example of a related service expected to increase the value of a new service; and informing the designer terminal 300 of a result of the search.

The process illustrated in FIG. 12 is achieved by the execution of the programs by the arithmetic apparatuses respectively in the service recommendation system 100, the service example storage system 200 and the designer terminal 300. Furthermore, the flow in FIG. 12 illustrates: steps S101 to S111 to be performed by the designer terminal 300; steps S201 to S204 to be performed by the service recommendation system 100; and steps S301 to S307 to be performed by the service example storage system 200.

(Business/Problem Definition Process)

With regard to the flow, to begin with, descriptions will be provided for a process of, from the designer terminal 300, receiving definition of business/problem information on a client's business, problem and value. Here, FIG. 15 illustrates an image of a design screen 1500 to be provided from the service example storage system 200 to the designer terminal 300, and to be used by the designer to define the business/problem. The design screen 1500 has a configuration which, as described above, includes: the template frame 1001 where the objects 1011 to 1017 associated with the object datasets in the object table 231 are displayed as the template group 1010; the service structure frame 1002 serving as the display area in which the designer places a desired object by dragging the desired object from the template group 1010; and the service example frame 1003 serving the display area where information on a similar service, information on a related service, and the objects are displayed.

In response to a specific instruction received from the designer by means of the input apparatus 305, the designer terminal 300 sends a request for a process to define the business/problem to the service example storage system 200. Thus, the designer terminal 300 obtains data on the design screen 1500 from the service example storage system 200, and causes the output apparatus 306 to display the design screen 1500. Via the design screen 1500, the designer terminal 300 receives an input of the business/problem information from the designer. Thereafter, the designer terminal 300 sends the service example storage system 200 the contents of the input which is received from the designer via the design screen 1500 (S101).

In step S101, the service description information reception part 310 in the designer terminal 300 receives the dragging and dropping of a business object 1013 from the template group 1010 in the template frame 1001 into a business area 1023 in a service structure frame 1002 by means of the input apparatus 305, and thereby places a business object 10231 into the business area 1023 in the design screen 1500.

Furthermore, the service description information reception part 310 in the designer terminal 300 receives a predetermined action (a click, double-click, or the like) on the business object 10231 by means of the input apparatus 305, and allows entry to the text entry field in the business object 10231. Thereby, the service description information reception part 310 receives an input of a business name from the designer. In addition, the service description information reception part 310 displays a property information input screen 1004 on the output apparatus 306. The property information input screen 1004 may be displayed therein by being acquired from the service example storage system 200 by the designer terminal 300 depending on a predetermined action, such as a right-click, on the business object 10231. Otherwise, the property information input screen 1004 may be included in the design screen data in advance, and used therefrom depending on a click. For the design screen, too, the screen data are acquired and displayed in the same way.

With regard to the relevant business object 10231, using the property information input screen 1004, the designer inputs information on the business classification, information on the type of industry and information on the business characteristics, which are the property information, via predetermined interfaces 1041 to 1043. As illustrated by the design screen 1500 in FIG. 15, as requirements for the relevant business, characteristic items such as "Reliability" and "Safety" are included in the business characteristics to be described by the designer for the business object. For each characteristic item, the designer defines the requirement level using a discrete value such as "High," "Middle" or "Low," or using a numerical value.

In this case, the designer terminal 300 receives the input of the property information by means of the input apparatus 305, and when a register button 1043 is pressed down, the designer terminal 300 sends the relevant property information and the business name to the service example storage system 200.

On the other hand, the service example storage system 200 receives the business name, business classification, type of industry, and business characteristics which are sent from the service description information reception part 310 in the designer terminal 300. The service example storage system 200 assigns a business ID to them, and stores a record including the relevant information into the client business information table 225 (S301). The assigned business ID serves as ID information for identifying the relevant object. For example, the business ID is defined like "001-B001" by combining: "001" which is a service example number representing a service to be designed for the relevant business; and "B001" which is the number of the relevant object. Two business IDs "001-B001" and "001-B002" having the same service example number "001," for example, mean that they are IDs representing business objects defined for a single service.

Thereafter, in step S102, the service description information reception part 310 in the designer terminal 300 receives the dragging and dropping of a problem object 1012 from the template group 1010 in the template frame 1001 into a problem area 1022 in the service structure frame 1002 by means of the input apparatus 305, and thereby places a problem object 10221 into the problem area 1022 in the design screen 1500.

Furthermore, the service description information reception part 310 in the designer terminal 300 receives a predetermined action (a click, double-click, or the like) on the problem object 10221 by means of the input apparatus 305, and allows entry to the text entry field in the problem object 10221. Thereby, the service description information reception part 310 receives an input of a problem business name from the designer. In addition, the service description information reception part 310 displays an input screen (not illustrated) for the property information on the problem, which is similar to the property information input screen 1004, on the output apparatus 306. The property information input screen of this case may also be displayed therein by being acquired from the service example storage system 200 by the designer terminal 300 depending on a predetermined action, such as a right-click, on the problem object 10221. Otherwise, the property information input screen may be included in the design screen data in advance, and used therefrom depending on a click.

With regard to the relevant problem object 10221, using the property information input screen, the designer inputs information on the problem classification and information on the type of industry, which are the property information, via predetermined interfaces. Furthermore, for the purpose of clarifying a relationship between the problem object 10221 and the business object 10231 which has a dependency relationship with the problem object 10221, the designer creates a link object 10171 for linking the relevant objects by dragging and dropping an arrow object 1017 from the template group 1010 into the interstice between the relevant objects. The information on the business object linked to the problem object 10221 with the link object 10171 serves as a value of the related link information on the relevant problem object.

Meanwhile, the designer terminal 300 receives the input of the property information on the problem object 10221 and the linking of the objects with the link object 10171 by means of the input apparatus 305. When a predetermined register button is pressed down, the designer terminal 300 sends the service example storage system 200 values respectively representing the information on a problem name, the information on the problem classification, the information on the type of industry, and the related link information.

On the other hand, the service example storage system 200 receives the values respectively representing the information on the problem name, the information on the problem classification, the information on the type of industry, and the related link information which are sent from the service description information reception part 310 in the designer terminal 300. The service example storage system 200 assigns a problem ID to them, and stores a record including the relevant information into the client problem information table 226 (S302). The assigned problem ID serves as ID information for identifying the relevant object. For example, the problem ID is defined like "001-I001" by combining: "001" which is the service example number representing the service to be designed for the relevant problem; and "I001" which is the number of the relevant object.

As illustrated in FIG. 6, for example, in the case of a problem object "Failure Reduction" associated with the problem ID "001-I001," the record thus stored into the client problem information table 226 can be assumed as being a record in which: the problem classification is set at a value representing "Failure"; the type of industry is set at a value representing "Construction"; and the business ID serving as the related link information is set at a value "001-B001." Incidentally, the business object which has a dependency relationship with the problem object having the problem ID "001-I001" indicated by this record is associated with the business ID "001-B001" indicated by the related link information. The business ID "001-B001" represents a business object associated with "Construction Execution" in the client business information table 225 in FIG. 5.

Thereafter, in step S103, the service description information reception part 310 in the designer terminal 300 receives the dragging and dropping of a value object 1011 from the template group 1010 in the template frame 1001 into a value area 1021 in the service structure frame 1002 by means of the input apparatus 305, and thereby places a value object 10211 into the value area 1021 in the design screen 1500.

Furthermore, the service description information reception part 310 in the designer terminal 300 receives a predetermined action (a click, double-click, or the like) on the value object 10211 by means of the input apparatus 305, and allows entry to the text entry field in the value object 10211. Thereby, the service description information reception part 310 receives an input of a value name from the designer. In addition, the service description information reception part 310 displays an input screen (not illustrated) for the property information on the value, which is similar to the property information input screen 1004, on the output apparatus 306. The property information input screen of this case may also be displayed therein by being acquired from the service example storage system 200 by the designer terminal 300 depending on a predetermined action, such as a right-click, on the value object 10211. Otherwise, the property information input screen may be included in the design screen data in advance, and used therefrom depending on a click.

With regard to the relevant value object 10211, using the property information input screen, the designer inputs information on the value classification, which is the property information, via predetermined interfaces. Furthermore, for the purpose of clarifying a relationship between the value object 10211 and the problem object 10221 which has a dependency relationship with the value object 10211, the designer creates a link object 10171 for linking the relevant objects by dragging and dropping an arrow object 1017 from the template group 1010 into the interstice between the relevant objects. The information on the problem object linked to the value object 10211 with the link object 10171 serves as a value of the related link information on the relevant value object.

Meanwhile, the designer terminal 300 receives the input of the property information on the value object 10211 and the linking of the objects with the link object 10171 by means of the input apparatus 305. When a predetermined register button is pressed down, the designer terminal 300 sends the service example storage system 200 values respectively representing the value name, value classification, and related link information.

On the other hand, the service example storage system 200 receives the values respectively representing the value name, value classification, and related link information which are sent from the service description information reception part 310 in the designer terminal 300. The service example storage system 200 assigns a value ID to them, and stores a record including the relevant information into the client value information table 227 (S303). The assigned value ID serves as ID information for identifying the relevant object. For example, the value ID is defined like "001-V001" by combining: "001" which is the service example number representing the service to be designed for the relevant vale; and "V001" which is the number of the object.

As illustrated in FIG. 7, for example, in the case of a value object "Failure Risk Reduction" associated with the value ID "001-V001," the record thus stored into the client value information table 227 can be assumed as being a record in which: the value classification is set at a value representing "Risk Reduction"; and the problem ID serving as the related link information is set at the value "001-I001." Incidentally, the problem object which has a dependency relationship with the value object represented by the value ID "001-V001" indicated by this record is associated with the problem ID "001-I001" indicated by the related link information. The problem ID "001-I001" represents a problem object which is associated with "Failure Reduction" in the client problem information table 226 in FIG. 6.

(Product/Technology Definition Process)

With regard to the flow in FIG. 12, next, descriptions will be provided for a process of, from the designer terminal 300, receiving definition of product/technology information on a product/technology to be used to solve a problem, and information on a product-related task. The design screen 1500 in FIG. 15 is used in this process, like in the client business definition process (S101) and the client problem definition process (S102).

In this case, in step S104, the service description information reception part 310 in the designer terminal 300 receives the dragging and dropping of a product/technology object 1016 from the template group 1010 in the template frame 1001 in the design screen 1500 into a product/technology area 1025 in the service structure frame 1002 in the design screen 1500 by means of the input apparatus 305, and thereby places a product/technology object 10251 into the product/technology area 1025 in the design screen 1500.

Furthermore, the service description information reception part 310 in the designer terminal 300 receives a predetermined action (a click, double-click, or the like) on the product/technology object 10251 by means of the input apparatus 305, and allows entry to the text entry field in the product/technology object 10251. Thereby, the service description information reception part 310 receives an input of a product/technology name from the designer. In addition, the service description information reception part 310 displays an input screen (not illustrated) for the property information on the product/technology, which is similar to the property information input screen 1004, on the output apparatus 306. The property information input screen of this case may also be displayed therein by being acquired from the service example storage system 200 by the designer terminal 300 depending on a predetermined action, such as a right-click, on the product/technology object 10251. Otherwise, this property information input screen may be included in the design screen data in advance, and used therefrom depending on a click.

With regard to the relevant product/technology object 10251, using the property information input screen, the designer inputs information on the product/technology classification and information on the type of industry, which are the property information, via predetermined interfaces. Furthermore, if a service object 10241 (not illustrated in FIG. 15) having a dependency relationship with the product/technology object 10251 has already been placed in a service area 1024, for the purpose of clarifying a relationship between the product/technology object 10251 and the service object 10241, the designer creates a link object 10171 for linking the relevant objects by dragging and dropping an arrow object 1017 from the template group 1010 into the interstice between the relevant objects. The information on the service object 10241 linked to the product/technology object 10251 with the link object 10171 serves as a value of the related link information on the relevant product/technology object.

It should be noted that the embodiment is intended to be carried out in a mode where, based on a similar service and a related service presented in the service example frame 1003 by the service recommendation system 100, the service object 10241 is placed in the service area 1024. For this reason, in the design screen 1500 illustrated in FIG. 16, the service object 10241 has not been placed in the service area 1024 yet, because neither the similar service nor the related service has been presented in the service example frame 1003 by the service recommendation system 100 yet. In this case, the designer only describes the property information without linking the product/technology object 10251 and the service object 10241 with the link object 10171.

Meanwhile, out of the input of the property information on the product/technology object 10251 and the linking of the objects with the link object 10171, the designer terminal 300 receives at least the input of the property information by means of the input apparatus 305. Out of the product/technology name, product/technology classification, type of industry, and related link information, the designer terminal 300 sends the service example storage system 200 values respectively representing at least the product/technology name, product/technology classification and type of industry when a predetermined register button is pressed down.

On the other hand, the service example storage system 200 receives the values respectively representing the product/technology name, product/technology classification, type of industry, and related link information, which are sent from the service description information reception part 310 in the designer terminal 300. The service example storage system 200 assigns a product/technology ID to them, and stores a record including the relevant information into the product/technology information table 228 (S304). The assigned product/technology ID serves as ID information for identifying the relevant object. For example, the product/technology ID is defined like "001-PT001" by combining: "001" which is the service example number representing the service to be designed for the relevant product/technology; and "PT001" which is the number of the object.

As illustrated in FIG. 8, for example, in the case of a product/technology object "Hydraulic Excavator" associated with the product/technology ID "001-PT001," the record thus stored into the product/technology information table 228 can be assumed as being a record in which: the product/technology classification is set at a value representing "Construction Machine"; the type of industry is set at a value representing "Construction"; and the service ID serving as the related link information is set at a value "001-S001." Incidentally, the service object which has a dependency relationship with the product/technology object represented by the product/technology ID "001-PT001" indicated by this record is associated with the service ID "001-S001" indicated by the related link information. The service ID "001-S001" represents a service object which is associated with "Construction Machine Utilization Rate Guarantee Service" in the service information table 230 in FIG. 11.

With regard to the flow in FIG. 12, next, descriptions will be provided for a process of, from the designer terminal 300, receiving definition of a product-related task related to the product/technology to be used to solve the problem. The design screen 1500 in FIG. 15 is used in this process, like in the client business definition process (S101) and the client problem definition process (S102).

In this case, in step S105, the service description information reception part 310 in the designer terminal 300 receives the dragging and dropping of a product-related task object 1015 from the template group 1010 in the template frame 1001 in the design screen 1500 into the product/technology area 1025 in the service structure frame 1002 in the design screen 1500 by means of the input apparatus 305, and thereby places a product-related task object 10252 into the product/technology area 1025 in the design screen 1500.

Furthermore, the service description information reception part 310 in the designer terminal 300 receives a predetermined action (a click, double-click, or the like) on the product-related task object 10252 by means of the input apparatus 305, and allows entry to the text entry field in the product-related task object 10252. Thereby, the service description information reception part 310 receives an input of a product-related task name from the designer. In addition, the service description information reception part 310 displays an input screen (not illustrated) for the property information on the product-related task, which is similar to the property information input screen 1004, on the output apparatus 306. The property information input screen of this case may also be displayed therein by being acquired from the service example storage system 200 by the designer terminal 300 depending on a predetermined action, such as a right-click, on the product-related task object 10252. Otherwise, this property information input screen may be included in the design screen data in advance, and used therefrom depending on a click.

With regard to the relevant product-related task object 10252, using the property information input screen, the designer inputs information on the product-related task classification and information on the type of industry, which are property information, via predetermined interfaces. Furthermore, for the purpose of clarifying a relationship between the product-related task object 10252 and the product/technology object 10251 which has a dependency relationship with the product-related task object 10252, the designer creates a link object 10171 for linking the relevant objects by dragging and dropping an arrow object 1017 from the template group 1010 into the interstice between the relevant objects. The information on the product/technology object 10251 linked to the product-related task object 10252 with the link object 10171 serves as a value of the related link information on the relevant product-related task object.

Meanwhile, the designer terminal 300 receives the input of the property information on the product-related task object 10252 and the linking of the objects with the link object 10171 by means of the input apparatus 305. When a predetermined register button is pressed down, the designer terminal 300 sends the service example storage system 200 values respectively representing the product-related task name, product-related task classification, type of industry, and related link information.

On the other hand, the service example storage system 200 receives the values respectively representing the product-related task name, product-related task classification, type of industry, and related link information, which are sent from the service description information reception part 310 in the designer terminal 300. The service example storage system 200 assigns a product-related task ID to them, and stores a record including the relevant information into the product-related task information table 229 (S305). The assigned product-related task ID serves as ID information for identifying the relevant object. For example, the product-related task ID is defined like "001-PB001" by combining: "001" which is the service example number representing the service to be designed for the relevant product-related task; and "PB001" which is the number of the object.

As illustrated in FIG. 9, for example, in the case of a product-related task object "Machine Introduction" associated with the product-related task ID "001-PB001," the record thus stored into the product-related task information table 229 can be assumed as being a record in which: the product-related task classification is set at a value representing "Introduction"; the type of industry is set at a value representing "Construction";

and the product/technology ID serving as the related link information is set at the value "001-PT001." Incidentally, the product/technology object which has a dependency relationship with the product-related task object represented by the product-related task ID "001-PB001" indicated by this record is associated with the service ID "001-PT001" indicated by the related link information. The product/technology ID "001-PT001" represents a product/technology object which is associated with "GPS Monitoring" in the product/technology information table 228 in FIG. 8.

(Similar Service Search Process)

Next, descriptions will be provided for a process of identifying a similar service in the embodiment. The similar service is intended to be searched for and identified depending on, for example, a request for a similar service example search which is received from the designer terminal 300. Needless to say, the similar service search is performed not only depending on the identification request from the designer terminal 300. The similar service search may be automatically performed by the service recommendation system 100 when the problem object 10221 and the business object 10231 are respectively placed into the corresponding areas 1022, 1023 on the design screen 1500, or in a search designation area 1030 (see FIG. 16) in the service example frame 1003 on the design screen 1500. In this case, it is assumed that the process is performed when a predetermined action, such as a right-click, on the problem object 10221, is performed on the design screen 1500 illustrated in FIG. 15. Furthermore, it is assumed that in response to the right-click, the designer terminal 300 places the relevant problem object 10221, the relevant business object 10231 and the in-between link object 10171 into the search designation area 1030 by copying them.

In this case, in responses to a right-click on the problem object 10221 placed in the problem area 1022 on the design screen 1500, the service description information transmission/reception part 311 in the designer terminal 300 recognizes the right-click as its reception of a similar service example search request, and sends the service recommendation system 100 a value representing the problem classification of the relevant problem object 10221, as well as values representing the business classification and business characteristics of the business object 10231 linked to the problem object 10221 with the link object 10171 (S106). In this respect, the values respectively representing the problem classification, the business classification and the business characteristics, which are sent by the designer terminal 300, are either those which the designer terminal 300 held in the memory 303 since receiving them using the property information input screen 1004 and, or those which the designer terminal 300 obtains from the service example storage system 200 by requesting the service example storage system 200.

On the other hand, the service similarity calculation part 111 in the service recommendation system 100 receives the problem classification, the business classification and the business characteristics which are sent from the designer terminal 300. By doing things such as comparing them with examples stored in the client problem information table 226 and the client business information table 225 in the service example storage system 200, the service recommendation system 100 derives a similar service (S201). Details of the process in step S201 is as illustrated by a flowchart in FIG. 13.

Figure 13:
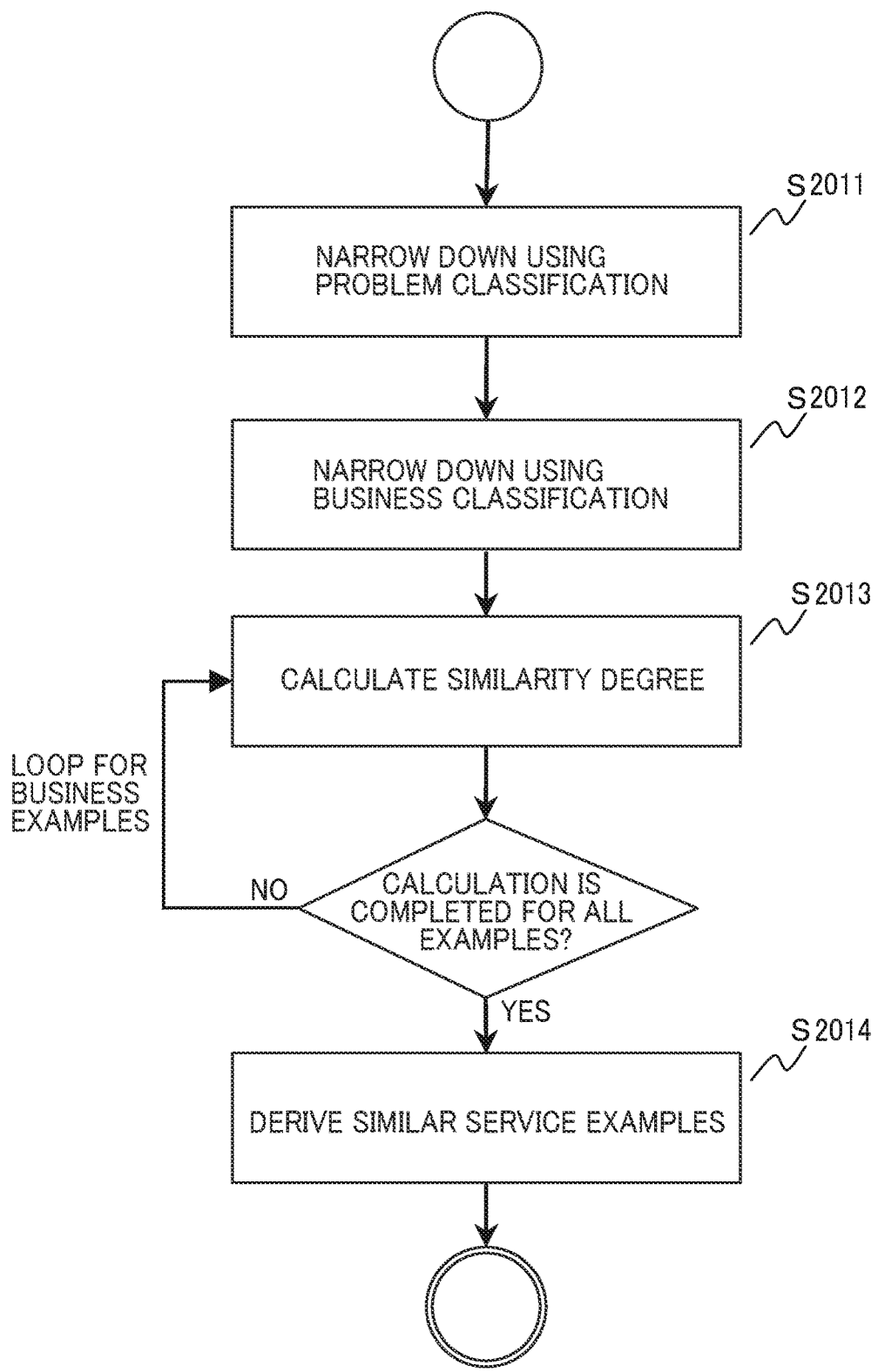
FIG. 13 is a flowchart illustrating Procedure example 2 of a service design assistance method.

FIG. 13 is a flowchart illustrating Procedure example 2 of the service design assistance method in the embodiment. To put it specifically, FIG. 13 is a flowchart illustrating how to calculate a degree of inter-service similarity. In this case, the service similarity calculation part 111 in the service recommendation system 100 searches the client problem information table 226 in the service example storage system 200 for a problem example whose problem classification matches the problem classification received from the designer terminal 300, and obtains a business ID which is indicated by the related link information of the problem example identified through the search (S2011). Let us assume, for example, a case where: the problem object 10221 placed in the problem area 1022 on the design screen 1500 by the designer as the current design target is a problem object associated with the problem ID "101-I001"; and this problem object is right-clicked. In this case, from the designer terminal 300, the service similarity calculation part 111 in the service recommendation system 100 receives "Failure" associated with the problem ID "101-I001," as a value of the problem classification. Thus, the service similarity calculation part 111 looks through examples in the client problem information table 226 by using the problem classification "Failure" as the key; identifies an example having the problem ID "001-I001" as a problem example whose problem classification is "Failure"; and obtains the business ID "001-B001" indicated by the related link information of this problem example.

Thereafter, the service similarity calculation part 111 in the service recommendation system 100 searches the client business information table 225 in the service example storage system 200 by using the business ID obtained in step S2011 as the key, and identifies business examples, whose business IDs match the business ID obtained in step S2011, from the examples in the client business information table 225. Furthermore, the service similarity calculation part 111 in the service recommendation system 100 narrows down the thus-identified business examples to a business example whose business classification matches the business classification obtained in step S2011, and obtains the business characteristics of the narrowed-down business example (S2012). For example, a business name "Construction Execution" associated with the business ID "001-B001" is identified as the business example whose business ID matches the business ID "001-B001" obtained in step S2011, and the business characteristics "Reliability: Middle, Safety: High, Facility Cost: High, Failure Risk: High" are obtained.

Subsequently, the service similarity calculation part 111 in the service recommendation system 100 compares the business characteristics of the business example obtained in S2012 with the business characteristics received from the designer terminal 300, and thereby calculates a similarity degree using a predetermined algorism such that a larger number of matching characteristics represents a higher similarity (S2013). For example, the business characteristics "Reliability: High, Safety: High, Facility Cost: High, Failure Risk: High" of the business name "Power Generation Operation" associated with the business ID "001-B001" received from the designer terminal 300 are compared with the business characteristics "Reliability: Middle, Safety: High, Facility Cost: High, Failure Risk: High" of the business name "Construction Execution" associated with the business ID "001-B001" obtained in step S2012. Since the matching items are "Safety," "Facility Cost" and "Failure Risk," that is to say, three of the four items match each other, the service similarity calculation part 111 calculates the similarity degree as "3/4." The service similarity calculation part 111 repeatedly performs the same process on all the business examples obtained in step S2012 (S2013: return to S2013 if No).

The following should be noted. In a case where a value of each item of the business characteristics is defined using a numerical value, for each item of the business characteristics, the service similarity calculation part 111 in the service recommendation system 100 calculates a difference between the numerical value received from the designer terminal 300 and the numerical value obtained in step S2012, and recognizes the difference as the distance between them in each item. Thereby, the service similarity calculation part 111 calculates the similarity degree such that for each item, a shorter distance, or a smaller difference represents a higher similarity degree.

Thereafter, the service similarity calculation part 111 in the service recommendation system 100 identifies the business example having the similarity degree greater than a predetermined threshold value as a similar business example; searches the service information table 230 in the service example storage system 200 for a service example which has the business ID of the business example in the related link information; and derives the relevant service example as a similar service example (S2014). For example, in a case where the threshold value for the similarity degree is "1/2," the service similarity calculation part 111 identifies "Construction Execution" with the business ID "001-B001" having the similarity degree greater than "1/2" as the similar business example, and derives "Construction Machine Utilization Rate Guarantee Service" with the service ID "001-S001" which has the business ID "001-B001" in the related link information as the similar service example.

Here, let us return to descriptions for the flow in FIG. 12. In this case, the similar service example transmission part 110 in the service recommendation system 100 sends the designer terminal 300 similar service examples identified in the above-discussed way, and their similarity degrees (S202).

On the other hand, the service search result display part 312 in the designer terminal 300 receives the similar service examples and their similarity degrees from the service recommendation system 100, and displays one of the received similar service examples, as a similar service object 1036, in a search result display area 1035 in the service example frame 1003 in descending order of similarity (S107). In this event, the service search result display part 312 in the designer terminal 300 identifies a product/technology example (GPS Monitoring, for instance) from the product/technology information table 228 using the product/technology ID (001-PT001, for instance) in the related link information of the relevant similar service examples as a key, and displays a product/technology object 1037 corresponding to the identified product/technology example, together with the similar service object 1036 in a way that the product/technology object 1037 is linked to the similar service object 1036 with a link object 10171. In the case of the above example, the similar service object 1036 is "Construction Machine Utilization Rate Guarantee Service," and the product/technology object 1037 is "GPS Monitoring."

Furthermore, in step S108, the service description information reception part 310 in the designer terminal 300 receives the dragging and dropping of the similar service object 1036, presented in the search result display area 1035 in the service example frame 1003 in the design screen 1500, into the service area 1024 in the service structure frame 1002 by means of the input apparatus 305, and thereby places the service object 10241 into the service area 1024 in the design screen 1500. Moreover, the service description information reception part 310 receives the dragging and dropping of the product/technology service object 1037, presented in the search result display area 1035, into the product/technology area 1025 in the service structure frame 1002 by means of the input apparatus 305, and thereby places one of the product/technology objects 10251 into the product/technology area 1025 in the design screen 1500.

In addition, the service description information reception part 310 in the designer terminal 300 receives a predetermined action (a click, double-click, or the like) on the service object 10241 by means of the input apparatus 305, and allows entry to the text entry field in the service object 10241. Thereby, the service description information reception part 310 receives an input of a service name from the designer. In addition, the service description information reception part 310 displays an input screen (not illustrated) for property information on a service/technology, which is similar to the property information input screen 1004, on the output apparatus 306. Similarly, the service description information reception part 310 in the designer terminal 300 receives a predetermined action (a click, double-click, or the like) on the product/technology object 10251, newly placed originating from the search result display area 1035, by means of the input apparatus 305, and allows entry to the text entry field in the product/technology object 10251. Thereby, the service description information reception part 310 receives an input of a product/technology name from the designer. In addition, the service description information reception part 310 displays an input screen (not illustrated) for the property information, which is similar to the property information input screen 1004, on the output apparatus 306. The property information input screen of these cases may also be displayed therein by being acquired from the service example storage system 200 by the designer terminal 300 depending on a predetermined action, such as a right-click, on the service object 10241 and the product/technology object 10251. Otherwise, the property information input screens may be included in the design screen data in advance, and used therefrom depending on a click.

Using the property information input screen, with regard to the relevant service object 10241, the designer inputs information on the service classification and information on the type of industry, which are the property information, via predetermined interfaces. Furthermore, with regard to the relevant product/technology object 10251, the designer inputs information on the product/technology classification and information on the type of industry, which are the property information, via predetermined interfaces. In addition, for the purpose of clarifying a relationship of the service object 10241 with the product/technology object 10251, the product-related task object 10252 and a business object 20231 which have a dependency relationship with the service object 10241, the designer creates link objects 10171 for linking the relevant objects by dragging and dropping arrow objects 1017 from the template group 1010 into the interstices between the relevant objects. The information on each object linked to the service object 10241 with the link object 10171 serves as a value of the related link information on the relevant service object. Similarly, the information on the service object 10241 serves as a value of the related link information on the relevant product/technology object 10251 in the product/technology information table 228.

Meanwhile, the designer terminal 300 receives the input of the property information on the service object 10241, the input of the property information on the product/technology object 10251, and the linking of the objects with the link objects 10171 by means of the input apparatus 305. When a predetermined register button is pressed down, the designer terminal 300 sends values of the property information and the link information to the service example storage system 200. Incidentally, an ID (similar service ID) of the similar service object 1036 which is a source of the service object 10241, that is to say, dragged and dropped into the service area 1024 from the search result display area 1035 is also sent from the designer terminal 300 to the service example storage system 200.

On the other hand, the service example storage system 200 receives the service name, service classification, type of industry, similar service ID and related link information which are sent from the service description information reception part 310 in the designer terminal 300. The service example storage system 200 assigns a business ID to them, and stores a record including the relevant information into the service information table 230 (S306).

The identification and presentation to the designer of the similar service in the above-discussed way means: presenting an example of a service, provided for a similar business/problem in a different industry or the like, in order to improve efficiency of creating service ideas through client/service provider collaboration; and enabling the designer, even if not familiar with services in multiple industries, to effectively create various service ideas.

(Related Service Search Process)

Next, descriptions will be provided for a process of, upon receipt from the designer of a request to search for a related service example, presenting the related service example by extracting it from past service examples. Such a related service example will have higher profitability and effectiveness if provided together with the service which is created the foregoing steps. Use of the related service makes it possible for the designer, even if less experienced, to design a service with high quality.

To begin with, FIG. 17 illustrates an image of a design screen 1700 to be displayed on the designer terminal 300 in order to search for such a related service example. The design screen 1700 is illustrated as one in which "Power Generation System Utilization Rate Guarantee Service" is created as a new service. Upon receipt of a predetermined action, such as a right-click, on the service object 10241 on the design screen 1700, the service description information transmission/reception part 311 in the designer terminal 300 recognizes the action as its reception of a request to search for a related service example for the relevant service, and sends the service recommendation system 100 a value of the service ID of the service object 10241 of the search object, and a value of a similar service ID (S109). In conjunction with this process, the designer terminal 300 places the relevant service object 10241 into a related service search area 1040 in the service example frame 1003 by copying it.

On the other hand, the service relevance calculation part 113 in the service recommendation system 100 performs a process of: receiving the service ID and the similar service ID which are sent from the designer terminal 300; by use of the thus-obtained ID values, searching the service information table 230 in the service example storage system 200 in a predetermined way; and calculating a degree of service relevance from a degree of co-occurrence between the services (S203). Based on a flowchart illustrated in FIG. 14, detailed descriptions will be provided for the process in step S203.

Figure 14:
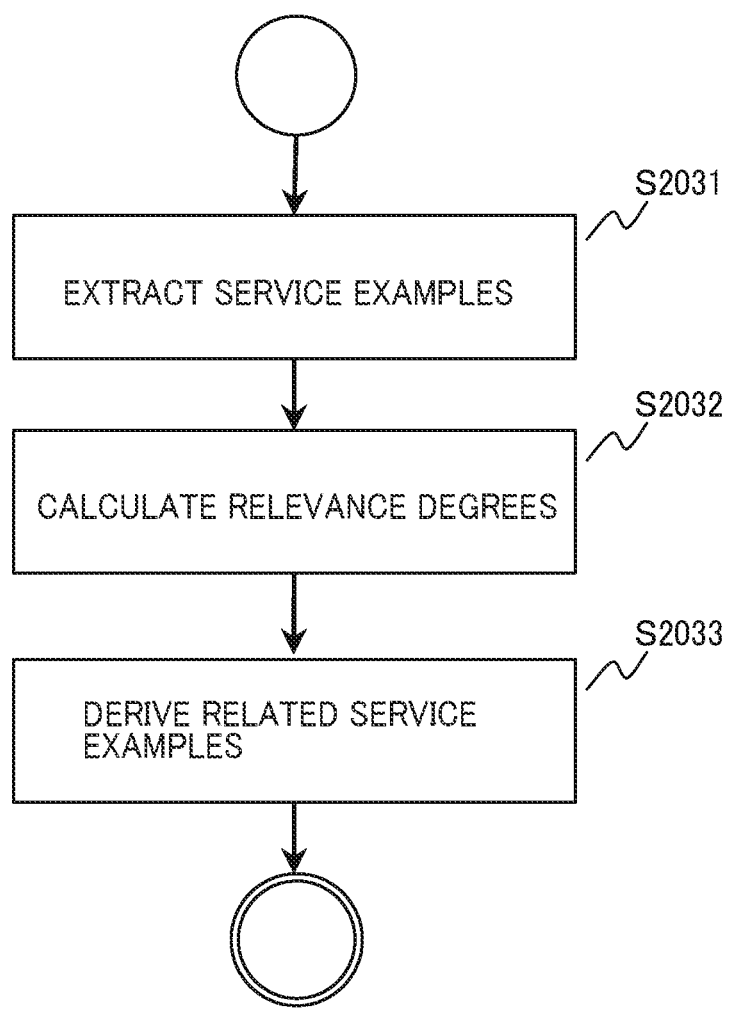
FIG. 14 is a flowchart illustrating Procedure example 3 of a service design assistance method.

FIG. 14 is a flowchart illustrating a third procedure example of the service design assistance method in the embodiment. To put it specifically, FIG. 14 is a flowchart illustrating how to calculate the degree of inter-service relevance. In this case, from the service information table 230, the service relevance calculation part 113 in the service recommendation system 100 extracts a service example the similar service ID of which matches the similar service ID received from the designer terminal 300 (S2031). Incidentally, in a case where the thus-extracted service example further has the same similar service ID, the service relevance calculation part 113 in the service recommendation system 100 further extracts another service example which matches the same similar service ID, and counts how many examples have been obtained in this way. With regard to the examples in the service information table 230, the service relevance calculation part 113 in the service recommendation system 100 repeats the serial process using the similar service ID as the key, until the service relevance calculation part 113 becomes able to identify a service example with no similar service ID set therefor. For example, the service relevance calculation part 113 extracts the service example "Power Generation System Utilization Rate Guarantee Service" which has a similar service ID "001-S001" corresponding to a service ID "101-S001" received from the designer terminal 300 as the service ID, and further extracts a service example "Medical Equipment Utilization Rate Guarantee Service" which has the similar service ID "001-S011" corresponding to "Power Generation System Utilization Rate Guarantee Service as the service ID." In addition, the service relevance calculation part 113 increases the example count to two.

Thereafter, with regard to each service example extracted from the service information table 230 in step S2013, the service relevance calculation part 113 in the service recommendation system 100 identifies a proven service which was provided in conjunction with the service, for example, based on the value of the service ID using the service information table 230. Let us assume that, for example, the service IDs of the service examples extracted in step S2031 are "001-S001" and "011-S001." In this case, by searching the service information table 230 using "001" out of the two service IDs, which uniquely represents a service itself, as a key, the service relevance calculation part 113 can identify "001-S002" and "001-S003" which represent examples of services provided in conjunction with this service. Similarly, by searching the service information table 230 using "011" as a key, the service relevance calculation part 113 can identify "011-S002" which represents an example of this service provided in conjunction with the service. In other words, a total of three examples can be identified as related service examples corresponding to the two service examples extracted in step S2031.

Subsequently, with regard to the three thus-identified service examples, the service relevance calculation part 113 in the service recommendation system 100 obtains values representing their service classifications. In the above example, the service classification included in "001-S002" is "Prediction"; the service classification included in "001-S003" is "Service by Agent"; and the service classification included in "011-S002" is "Prediction." For this reason, an occurrence frequency of "Prediction" is calculated at "2," and an occurrence frequency of "Service by Agent" is calculated at "1."

Furthermore, for each relevant service classification, that is to say, for the related service corresponding to each relevant service classification, the service relevance calculation part 113 in the service recommendation system 100 calculates a relevance degree in the form of a fraction where: the numerator represents the calculated occurrence frequency of each service classification; and the denominator represents the total number of related service examples (S2032). In the above example, with regard to the service classification "Prediction," the service relevance calculation part 113 calculates its relevance degree at "2/3" from the occurrence frequency "2" and the total number of examples "3." Meanwhile, with regard to the service classification "Service by Agent," the service relevance calculation part 113 calculates its relevance degree at "1/3" from the occurrence frequency "1" and the total number of examples "3."

After that, the service relevance calculation part 113 in the service recommendation system 100 derives as related service examples the service examples whose relevance degrees obtained in step S2032 are greater than a predetermined threshold value (S2033). For example, in a case where the threshold value for the relevance degree is "1/2," "Construction Machine Failure Prediction Service" represented by the service ID "001-S002" and "Medical Equipment Failure Prediction Service" represented by the service ID "011-S002" are derived as the related service examples because their service IDs correspond to the service classification "Prediction: 2/3" whose relevance degree is greater than "1/2."

Here, let us return to the descriptions for the flow in FIG. 12. After that, the related service transmission part 112 in the service recommendation system 100 sends the designer terminal 300 the related service examples and their relevance degrees which are obtained in step S2033 (S203).

On the other hand, the service search result display part 312 in the designer terminal 300 receives the related service examples and their relevance degrees which are sent from the service recommendation system 100, and displays one of the received related service examples, as a related service object 1046, in a search result display area 1045 in the service example frame 1003 in descending order of relevance. Simultaneously, the service search result display part 312 displays a product/technology object 1047 corresponding to the product/technology ID indicated by the related link information included in the related service example (S110).

Furthermore, in step S111, the service description information reception part 310 in the designer terminal 300 receives the dragging and dropping of the related service object 1046, presented in the search result display area 1045 in the service example frame 1003 in the design screen 1500, into the service area 1024 in the service structure frame 1002 by means of the input apparatus 305, and thereby places the service object 10242 into the service area 1024 in the design screen 1500. Moreover, the service description information reception part 310 receives the dragging and dropping of the product/technology service object 1047, presented in the search result display area 1045, into the product/technology area 1025 in the service structure frame 1002 by means of the input apparatus 305, and thereby places one of the product/technology objects 10251 into the product/technology area 1025 in the design screen 1500.

In addition, the service description information reception part 310 in the designer terminal 300 receives a predetermined action (a click, double-click, or the like) on the service object 10242 by means of the input apparatus 305, and allows entry to the text entry field in the service object 10242. Thereby, the service description information reception part 310 receives an input of a service name from the designer. In addition, the service description information reception part 310 displays an input screen (not illustrated) for property information on a service/technology, which is similar to the property information input screen 1004, on the output apparatus 306. Similarly, the service description information reception part 310 receives a predetermined action (a click, double-click, or the like) on the product/technology object 10251, newly placed originating from the search result display area 1045, by means of the input apparatus 305, and allows entry to the text entry field in the product/technology object 10251. Thereby, the service description information reception part 310 receives an input of a product/technology name from the designer. In addition, the service description information reception part 310 displays an input screen (not illustrated) for the property information, which is similar to the property information input screen 1004, on the output apparatus 306. The property information input screen of this case may also be displayed therein by being acquired from the service example storage system 200 by the designer terminal 300 depending on a predetermined action, such as a right-click, on the service object 10242 and the product/technology object 10251. Otherwise, the property information input screens may be included in the design screen data in advance, and used therefrom depending on a click.

Using the property information input screen, with regard to the relevant service object 10242, the designer inputs information on the service classification and information on the type of industry, which are the property information, via predetermined interfaces. Furthermore, with regard to the relevant product/technology object 10251, the designer inputs information on the product/technology classification and information on the type of industry, which are the property information, via predetermined interfaces. In addition, for the purpose of clarifying a relationship of the service object 10242 with the product/technology object 10251, the product-related task object 10252 and the business object 20231 which have a dependency relationship with the service object 10242, the designer creates link objects 10171 for linking the relevant objects by dragging and dropping arrow objects 1017 from the template group 1010 into the interstices between the relevant objects. The information on each object linked to the service object 10242 with the link object 10171 serves as a value of the related link information on the relevant service object. Similarly, the information on the service object 10242 serves as a value of the related link information on the relevant product/technology object 10251 in the product/technology information table 228.

Meanwhile, the designer terminal 300 receives the input of the property information on the service object 10242, the input of the property information on the product/technology object 10251, and the linking of the objects with the link objects 10171 by means of the input apparatus 305. When a predetermined register buttons is pressed down, the designer terminal 300 sends values of the property information and the link information to the service example storage system 200. Incidentally, an ID of the related service object 1046 (similar service ID) which is a source of the service object 10242, that is to say, dragged and dropped into the service area 1024 from the search result display area 1045 is also sent from the designer terminal 300 to the service example storage system 200.

On the other hand, the service example storage system 200 receives the service name, service classification, type of industry, similar service ID and related link information which are sent from the service description information reception part 310 in the designer terminal 300. The service example storage system 200 assigns a business ID to them, and stores a record including the relevant information into the service information table 230 (S307).

The foregoing descriptions are intended to make the embodiments of the invention easy to understand, and shall not be construed as limiting the invention. In the embodiment, each time an object is defined, the information on the definition is sent and stored. It should be noted, however, that information on the definitions of multiple objects may be sent and stored in batches. Needless to say, the embodiments of the invention may be modified and/or improved without departing from its spirit, and includes equivalents thereof.

The embodiments makes it possible, for example, to carry out a project of designing a new service for a client company with higher accuracy and efficiency by appropriately presenting not only a service suitable for solving a client problem, but also a related service which is searched for and extracted from knowledge covering multiple business fields in order to increase the profitability and effectiveness of the service.

Accordingly, the embodiments makes it possible to efficiently and appropriately assist in the service design by, in a multifaceted and easy-to-understand way, presenting: a service effective in solving a business problem; and products and technologies needed for the service.

The descriptions in this specification clarify at least the followings. To put it specifically, the service design assistance system in the embodiment may be configured such that the storage apparatus further stores example information of services having provided values toward solving problems with past businesses, and the arithmetic apparatus further performs a process including: based on attributes of the placed problem object, identifying a past problem with a certain attribute common to the problem object from the example information; extracting characteristic information on a past business related to the identified problem; determining a degree of similarity of the characteristic information with characteristic information indicated by the attributes of the problem relevant to the new design target; identifying, as a similar service, a past service provided for a past business having the degree of similarity equal to or greater than a predetermined reference level; and displaying an object representing information on the similar service in a corresponding area on the design screen in a manner selectable as an object of the service of the new design target.

Thereby, a service related to the service of the current design target, that is to say, a service expected to convert into the service of the current design target because of appropriate in-between similarity is extracted from past examples, and presented to the user. For this reason, it is possible to carry out the service design project more efficiently and quickly.

Furthermore, the service design assistance system in the embodiment may be configured such that the storage apparatus further stores example information of services having provided values toward solving problems with past businesses, and the arithmetic apparatus further performs a process including: based on attributes of the placed problem object, identifying a past problem with a certain attribute common to the problem object from the example information; extracting characteristic information on a past business related to the identified problem; determining a degree of similarity of the characteristic information with characteristic information indicated by the attributes of the problem relevant to the new design target; identifying, as a similar service, a past service provided for the past business having the degree of similarity equal to or greater than a predetermined reference level; and displaying an object representing information on the similar service in a corresponding area on the design screen in a manner selectable as an object of the service of the new design target, as well as a process including: via the input apparatus, receiving a request to place the object of the similar service into an object display area for the service of the new design target, and placing the object of the similar service into the display area; via the input apparatus, receiving a name and attribute of the object, and an instruction to place a link object depending on a relationship between the object and another object; on the output apparatus, displaying the objects linked to each other with the link object; and into the storage apparatus, storing information on the name and the attribute of the object and the relationship between the objects.

Thereby, a service related to the service of the current design target, that is to say, a service expected to convert into the service of the current design target because of appropriate in-between similarity is extracted from past examples, and presented to the user. Furthermore, upon receipt from the user of an instruction to employ and use the similar service for the service of the current design target by making appropriate modifications to the similar service, a variety of information needed to execute the instruction is obtained as information for the service design. For these reasons, it is possible to carry out the service design project much more efficiently and quickly.

Moreover, the service design assistance system in the embodiment may be configured such that the storage apparatus further stores example information of services having provided values toward solving problems with past businesses, and the arithmetic apparatus further performs a process including: based on attributes of the placed problem object, identifying a past problem with a certain attribute common to the problem object from the example information; extracting characteristic information on a past business related to the identified problem; determining a degree of similarity of the characteristic information with characteristic information indicated by the attributes of the problem relevant to the new design target; identifying, as a similar service, a past service provided for the past business having the degree of similarity equal to or greater than a predetermined reference level; and displaying an object representing information on the similar service in a corresponding area on the design screen in a manner selectable as an object of the service of the new design target, and a process including: via the input apparatus, receiving a request to place the object of the similar service into an object display area for the service of the new design target, and placing the object of the similar service in the display area as an object of the service of the new design target; via the input apparatus, receiving a name and attribute of the object, and an instruction to place a link object depending on a relationship between the object and another object; on the output apparatus, displaying the objects linked to each other with the link object; and into the storage apparatus, storing information on the name and the attribute of the object, the relationship between the objects, and a similarity relationship between the similar service and the service of the new design target, as well as a process including: with regard to the similar service whose object is requested to be placed into the display area, identifying services having a series of similarity relationships with the similar service, and related services provided in conjunction with the services from the example information; identifying related services with co-occurrence equal to or greater than a predetermined reference level among the identified services; and displaying an object representing information on each of the related services in a corresponding area on the design screen in a manner selectable as an object of the service of the new design target.

Thereby, a service related to the service of the current design target, that is to say, a service expected to convert into the service of the current design target because of appropriate in-between similarity is extracted from past examples, and presented to the user. Furthermore, upon receipt from the user of an instruction to employ and use the similar service for the service of the current design target by making appropriate modifications to the similar service, a variety of information needed to execute the instruction is obtained as information for the service design. In addition, each of the related services having a strong tendency to be employed together among the past services from which the employed similar service is selected is presented to the user such that the related service is employable for the service of the current design target. For these reasons, it is possible to carry out the service design project far more efficiently and quickly.

In addition, the service design assistance system in the embodiment may be configured such that the storage apparatus further stores example information of services having provided values toward solving problems with past businesses, and the arithmetic apparatus further performs a process including: based on attributes of the placed problem object, identifying a past problem with a certain attribute common to the problem object from the example information; extracting characteristic information on a past business related to the identified problem; determining a degree of similarity of the characteristic information with characteristic information indicated by the attributes of the problem relevant to the new design target; identifying, as a similar service, a past service provided for the past business having the degree of similarity equal to or greater than a predetermined reference level; and displaying an object representing information on the similar service in a corresponding area on the design screen in a manner selectable as an object of the service of the new design target, a process including: via the input apparatus, receiving a request to place the object of the similar service into an object display area for the service of the new design target, and placing the object of the similar service in the display area as an object of the service of the new design target; via the input apparatus, receiving a name and attribute of the object, and an instruction to place a link object depending on a relationship between the object and another object; on the output apparatus, displaying the objects linked to each other with the link object; and into the storage apparatus, storing information on the name and the attribute of the object, the relationship between the objects, and a similarity relationship between the similar service and the service of the new design target, and a process including: with regard to the similar service whose object is requested to be placed into the display area, identifying services having a series of similarity relationships with the similar service and related services provided in conjunction with the services from the example information; identifying related services with co-occurrence equal to or greater than a predetermined reference level among the identified services; and displaying an object representing information on each of the related services in a corresponding area on the design screen in a manner selectable as an object of the service of the new design target, as well as a process including: via the input apparatus, receiving a request to place the object of the related service into an object display area for the service of the new design target, and placing the object of the related service into the display area; via the input apparatus, receiving a name and attribute of the object, and an instruction to place a link object depending on a relationship between the object and another object; on the output apparatus, displaying the objects linked to each other with the link object; and into the storage apparatus, storing information on the name and the attribute of the object and the relationship between the objects.

Thereby, a service related to the service of the current design target, that is to say, a service expected to convert into the service of the current design target because of appropriate in-between similarity is extracted from past examples, and presented to the user. Furthermore, upon receipt from the user of an instruction to employ and use the similar service for the service of the current design target by making appropriate modifications to the similar service, a variety of information needed to execute the instruction is obtained as information for the service design. In addition, each of the related services having a strong tendency to be employed together among the past services from which the employed similar service is selected is presented to the user. Moreover, upon receipt from the user of an instruction to employ and use the related service for the service of the current design target by making appropriate modifications to the related service, a variety of information needed to execute the instruction is obtained as information for the service design. For these reasons, it is possible to carry out the service design project by far more efficiently and quickly.

Besides, the service design assistance method in the embodiment may be configured such that the computer system further stores example information of services having provided values toward solving problems with past businesses into the storage apparatus, and further performs a process including: based on attributes of the placed problem object, identifying a past problem with a certain attribute common to the problem obj ect from the example information; extracting characteristic information on a past business related to the identified problem; determining a degree of similarity of the characteristic information with characteristic information indicated by the attributes of the problem relevant to the new design target; identifying, as a similar service, a past service provided for the past business having the degree of similarity equal to or greater than a predetermined reference level; and displaying an object representing information on the similar service in a corresponding area on the design screen in a manner selectable as an object of the service of the new design target.

In addition, the service design assistance method in the embodiment may be configured such that the computer system further stores example information of services having provided values toward solving problems with past businesses into the storage apparatus, and further performs a process including: based on attributes of the placed problem object, identifying a past problem with a certain attribute common to the problem object from the example information; extracting characteristic information on a past business related to the identified problem; determining a degree of similarity of the characteristic information with characteristic information indicated by the attributes of the problem relevant to the new design target; identifying, as a similar service, a past service provided for the past business having the degree of similarity equal to or greater than a predetermined reference level; and displaying an object representing information on the similar service in a corresponding area on the design screen in a manner selectable as an object of the service of the new design target, and a process including: via the input apparatus, receiving a request to place the object of the similar service into an object display area for the service of the new design target, and placing the object of the similar service into the display area; via the input apparatus, receiving a name and attribute of the object, and an instruction to place a link object depending on a relationship between the object and another object; on the output apparatus, displaying the objects linked to each other with the link object; and into the storage apparatus, storing information on the name and the attribute of the object and the relationship between the objects.

Furthermore, the service design assistance method in the embodiment may be configured such that the computer system further stores example information of services having provided values toward solving problems with past businesses into the storage apparatus, and further performs a process including: based on attributes of the placed problem object, identifying a past problem with a certain attribute common to the problem object from the example information; extracting characteristic information on a past business related to the identified problem; determining a degree of similarity of the characteristic information with characteristic information indicated by the attributes of the problem relevant to the new design target; identifying, as a similar service, a past service provided for the past business having the degree of similarity equal to or greater than a predetermined reference level; and displaying an object representing information on the similar service in a corresponding area on the design screen in a manner selectable as an object of the service of the new design target, and a process including: via the input apparatus, receiving a request to place the object of the similar service into an object display area for the service of the new design target, and placing the object of the similar service in the display area as an object of the service of the new design target; via the input apparatus, receiving a name and attribute of the object, and an instruction to place a link object depending on a relationship between the object and another object; on the output apparatus, displaying the objects linked to each other with the link object; and into the storage apparatus, storing information on the name and the attribute of the object, the relationship between the objects, and a similarity relationship between the similar service and the service of the new design target, as well as a process including: with regard to the similar service whose object is requested to be placed into the display area, identifying services having a series of similarity relationships with the similar service and related services provided in conjunction with the services from the example information; identifying related services with co-occurrence equal to or greater than a predetermined reference level among the identified services; and displaying an object representing information on each of the related services in a corresponding area on the design screen in a manner selectable as an object of the service of the new design target.

Moreover, the service design assistance method in the embodiment may be configured such that the computer system further stores example information of services having provided values toward solving problems with past businesses into the storage apparatus, and further performs a process including: based on attributes of the placed problem object, identifying a past problem with a certain attribute common to the problem obj ect from the example information; extracting characteristic information on a past business related to the identified problem; determining a degree of similarity of the characteristic information with characteristic information indicated by the attributes of the problem relevant to the new design target; identifying, as a similar service, a past service provided for the past business having the degree of similarity equal to or greater than a predetermined reference level; and displaying an object representing information on the similar service in a corresponding area on the design screen in a manner selectable as an object of the service of the new design target, a process including: via the input apparatus, receiving a request to place the object of the similar service into an object display area for the service of the new design target, and placing the object of the similar service in the display area as an object of the service of the new design target; via the input apparatus, receiving a name and attribute of the object, and an instruction to place a link object depending on a relationship between the object and another object; on the output apparatus, displaying the objects linked to each other with the link object; and into the storage apparatus, storing information on the name and the attribute of the object, the relationship between the objects, and a similarity relationship between the similar service and the service of the new design target, and a process including: with regard to the similar service whose object is requested to be placed into the display area, identifying services having a series of similarity relationships with the similar service and related services provided in conjunction with the services from the example information; identifying related services with co-occurrence equal to or greater than a predetermined reference level among the identified services; and displaying an object representing information on each of the related services in a corresponding area on the design screen in a manner selectable as an object of the service of the new design target, as well as a process including: via the input apparatus, receiving a request to place the object of the related service into an object display area for the service of the new design target, and placing the object of the related service into the display area; via the input apparatus, receiving a name and attribute of the object, and an instruction to place a link object depending on a relationship between the object and another object; on the output apparatus, displaying the objects linked to each other with the link object; and into the storage apparatus, storing information on the name and the attribute of the object and the relationship between the objects.

REFERENCE SIGNS LIST 1 service design assistance system
100 service recommendation system
102 program
103 memory
104 arithmetic apparatus
105 communication apparatus
110 similar service example transmission part
111 service similarity calculation part
112 related service example transmission part
113 service relevance calculation part
200 service example storage system
201 storage apparatus
202 program 203 memory
204 arithmetic apparatus
205 communication apparatus
225 client business information table
226 client problem information table
227 client value information table
228 product/technology information table
229 product-related task information table
230 service information table
231 object table
232 design screen data
300 designer terminal
301 storage apparatus
302 program
303 memory
304 arithmetic apparatus
305 input apparatus
306 output apparatus
307 communication apparatus
310 service description information reception part
311 service description information transmission/reception part
312 service search result display part
400 network

The invention claimed is:

1. A computer implemented method for predicting a common failure problem occurring among different services in different technologies, the computer implemented method comprising:

creating, at a design screen of a designer terminal, a template frame comprising a plurality of objects representing a new designed target service and a failure problem associated with the new designed target service;

dragging and dropping, by a designer at the design screen, the new designed target service and the failure problem, from the template frame into a service structure frame;

recognizing, by the service structure frame, a classification of the failure problem and a type of industry having the failure problem without the designer having to link the new designed target service to a respective technology of the new designed target service;

automatically performing, by a service recommendation system, a similar service search in records of the different technologies, by repeatedly extracting, from said records, ones of the different services with service identifiers similar to the new designed target service, until the service recommendation system is unable to identify any other service with a similar identifier to the new designed target service;

detecting, by the service recommendation system, occurrence frequencies of the failure problem in classifications of the ones of the different services in the different technologies;

calculating for each classification, a relevance degree fraction having at numerator the occurrence frequency and at denominator a total number of the ones of the different services in the different technologies;

deriving a common failure prediction value among the new designed target service and the ones of the different services in the different technologies based on a service classification value whose relevance is greater than a predetermined threshold of the relevance degree;

identifying, by the service recommendation system, machine construction and medical equipment as technologies, among the different technologies, having the common failure prediction value greater than the predetermined threshold;

sending, from the service recommendation system to the designer terminal, the relevance degree fraction predicting the common failure among the new designed target service and the ones of the different services in the different technologies.

* * * * *